March 5, 1935.  A. MARCHEV  1,993,557
DUPLICATING MACHINE
Filed Oct. 31, 1932  12 Sheets-Sheet 2
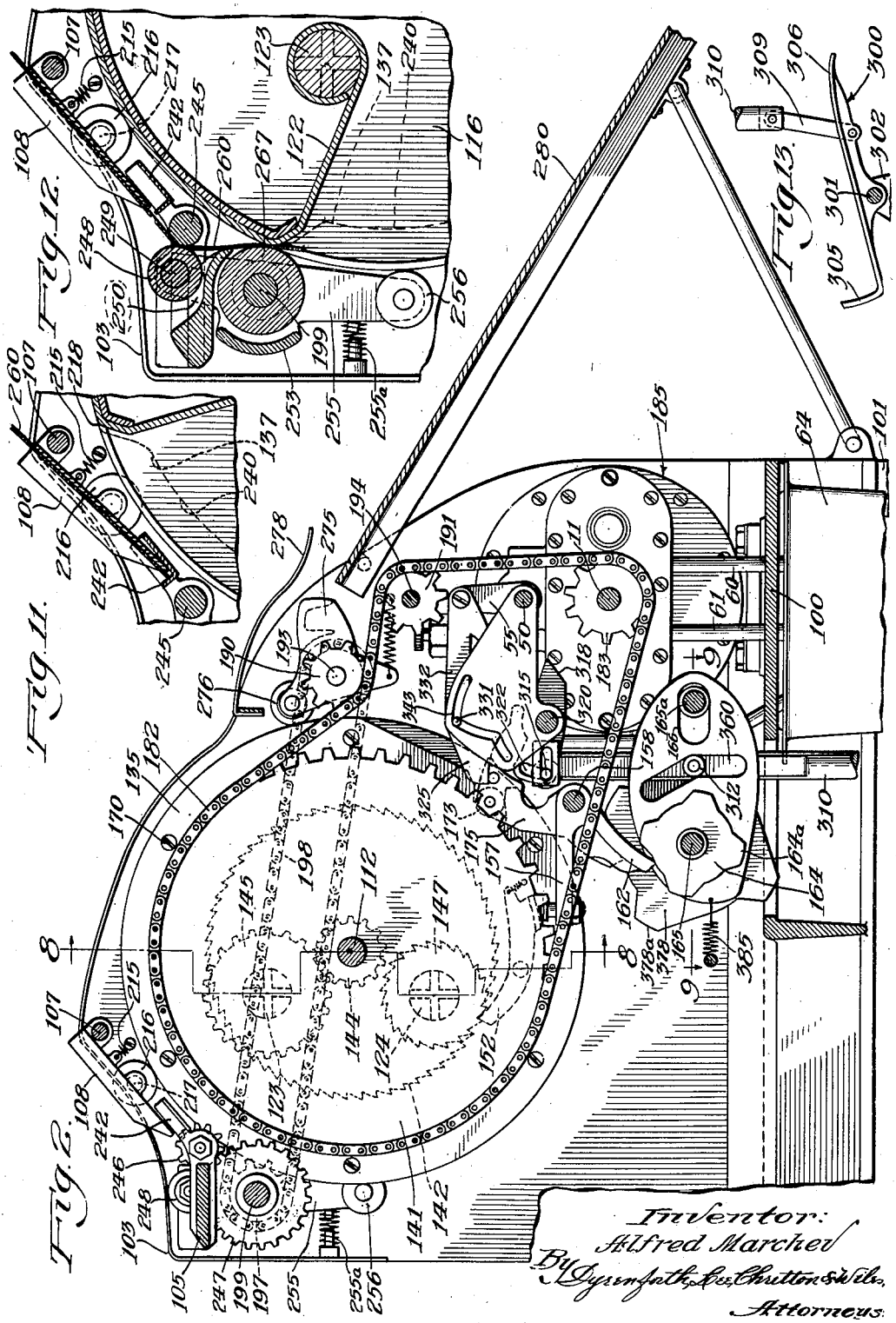

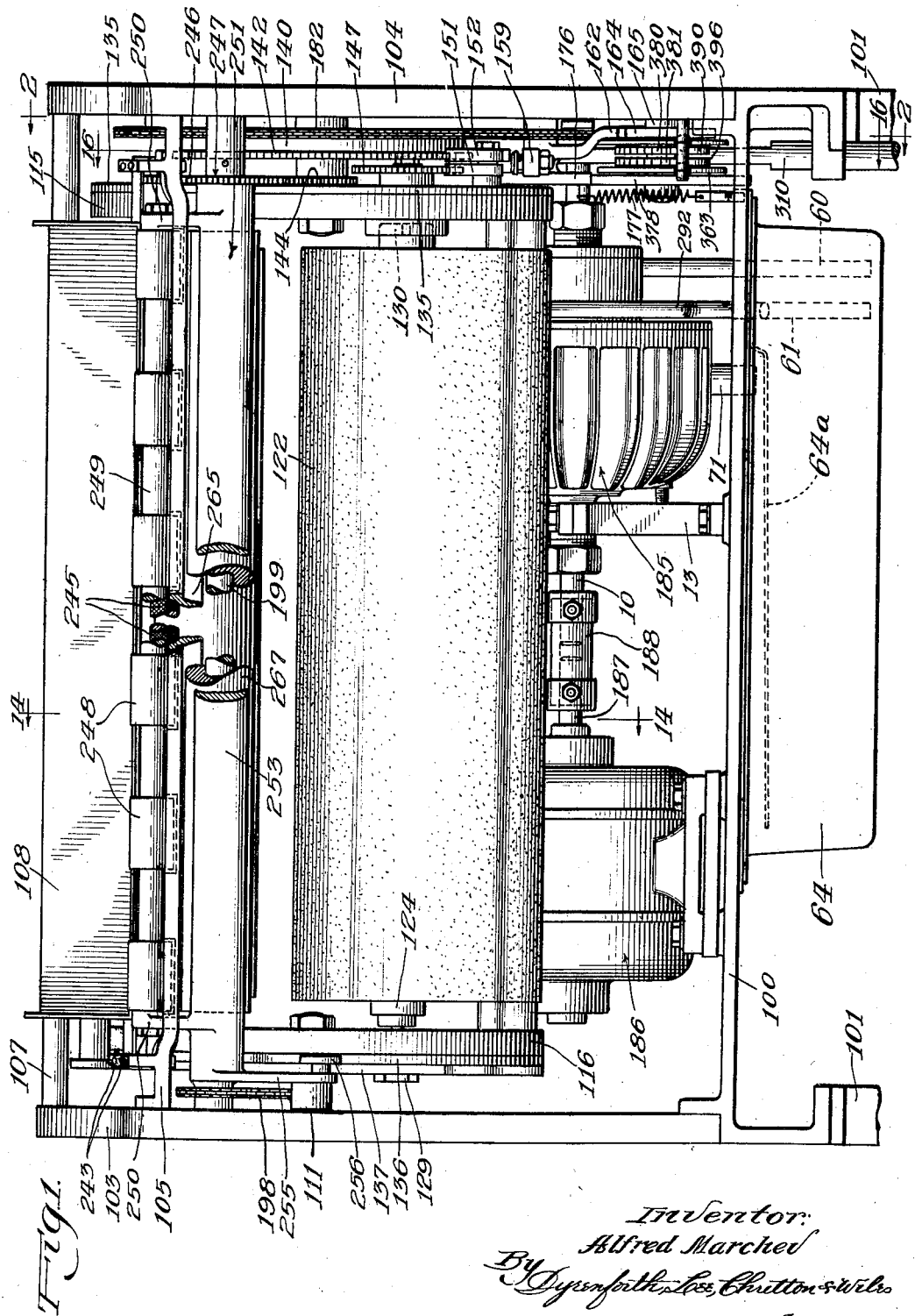

March 5, 1935.  A. MARCHEV  1,993,557
DUPLICATING MACHINE
Filed Oct. 31, 1932  12 Sheets-Sheet 3
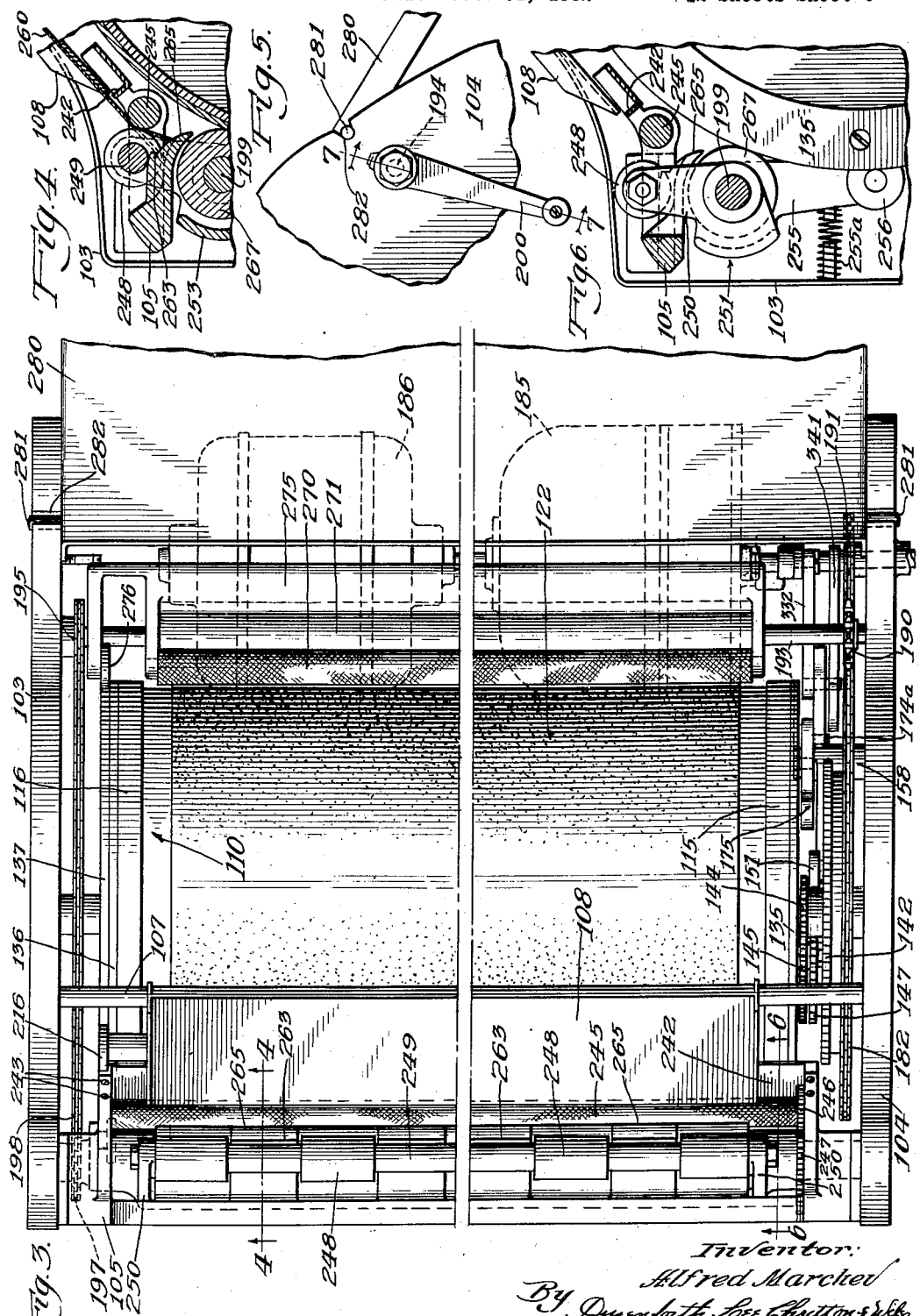

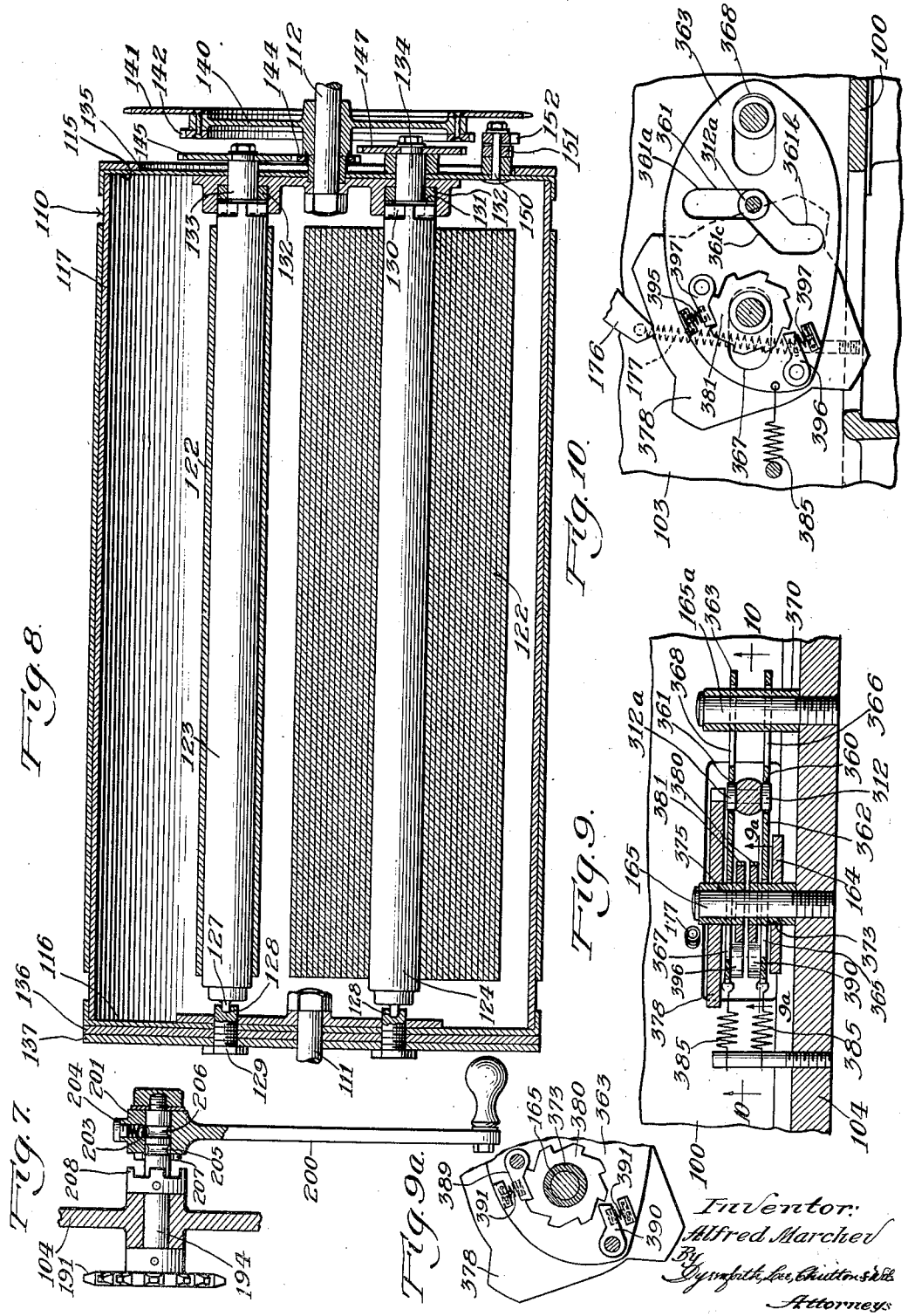

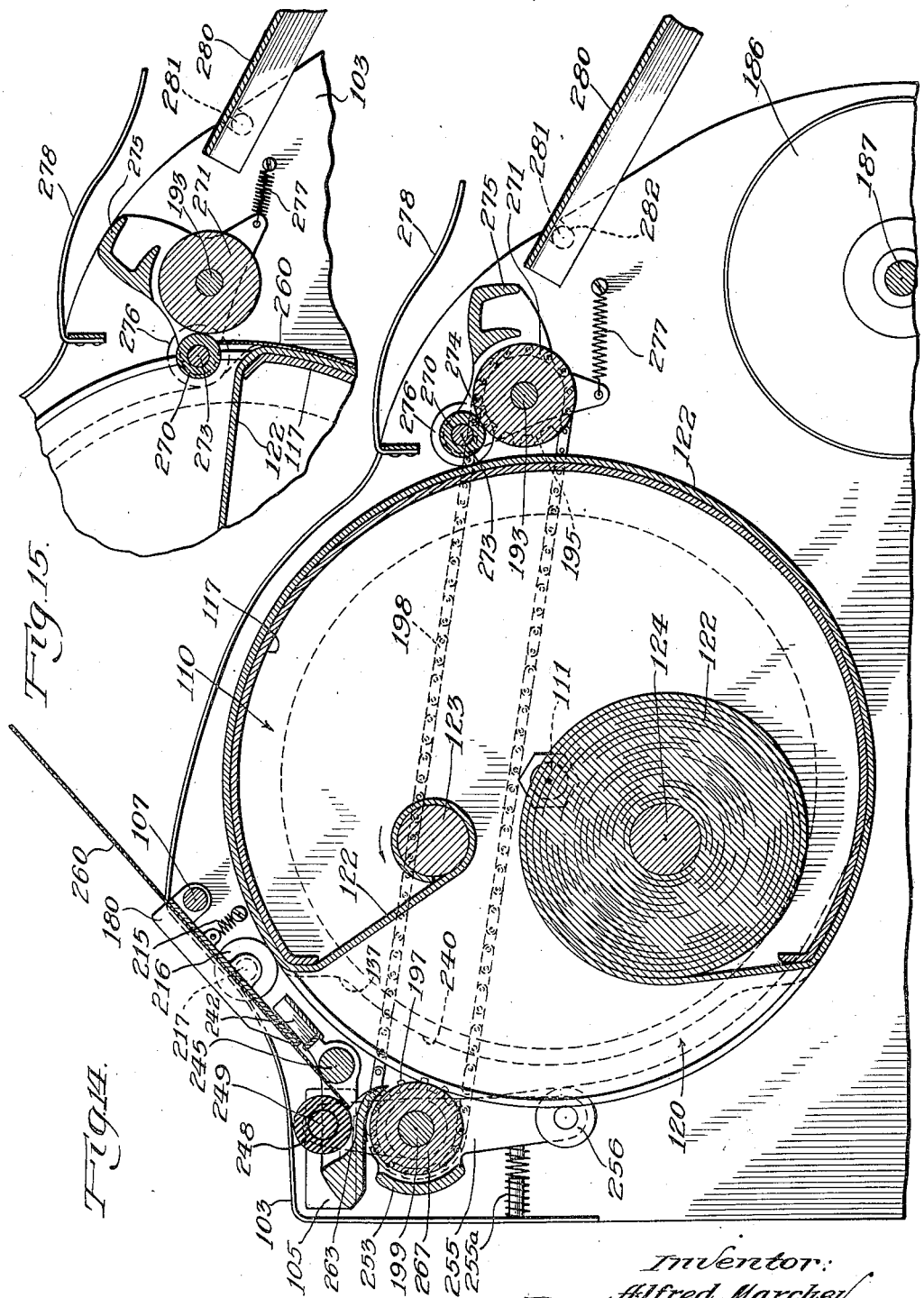

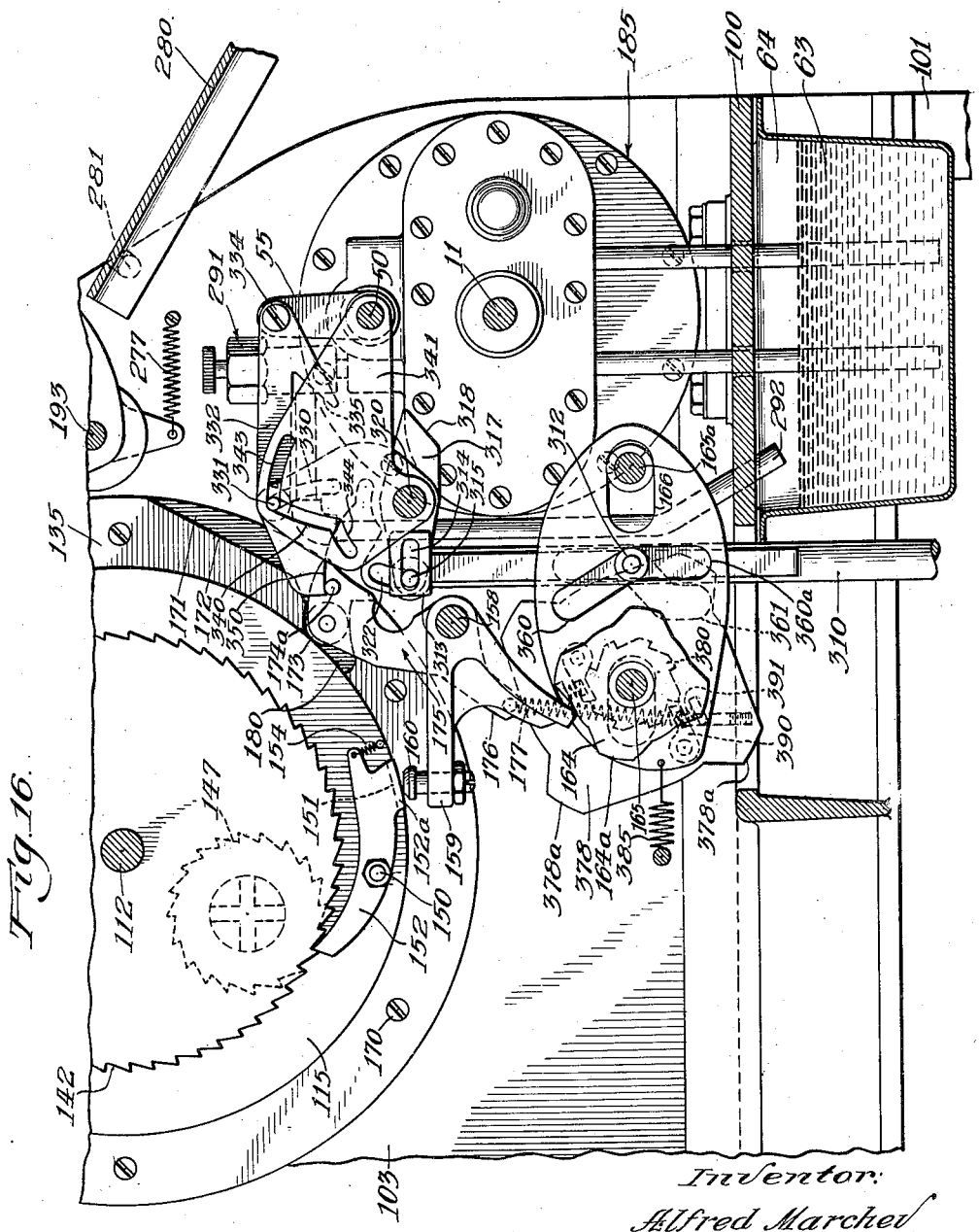

March 5, 1935. A. MARCHEV 1,993,557
DUPLICATING MACHINE
Filed Oct. 31, 1932 12 Sheets-Sheet 7
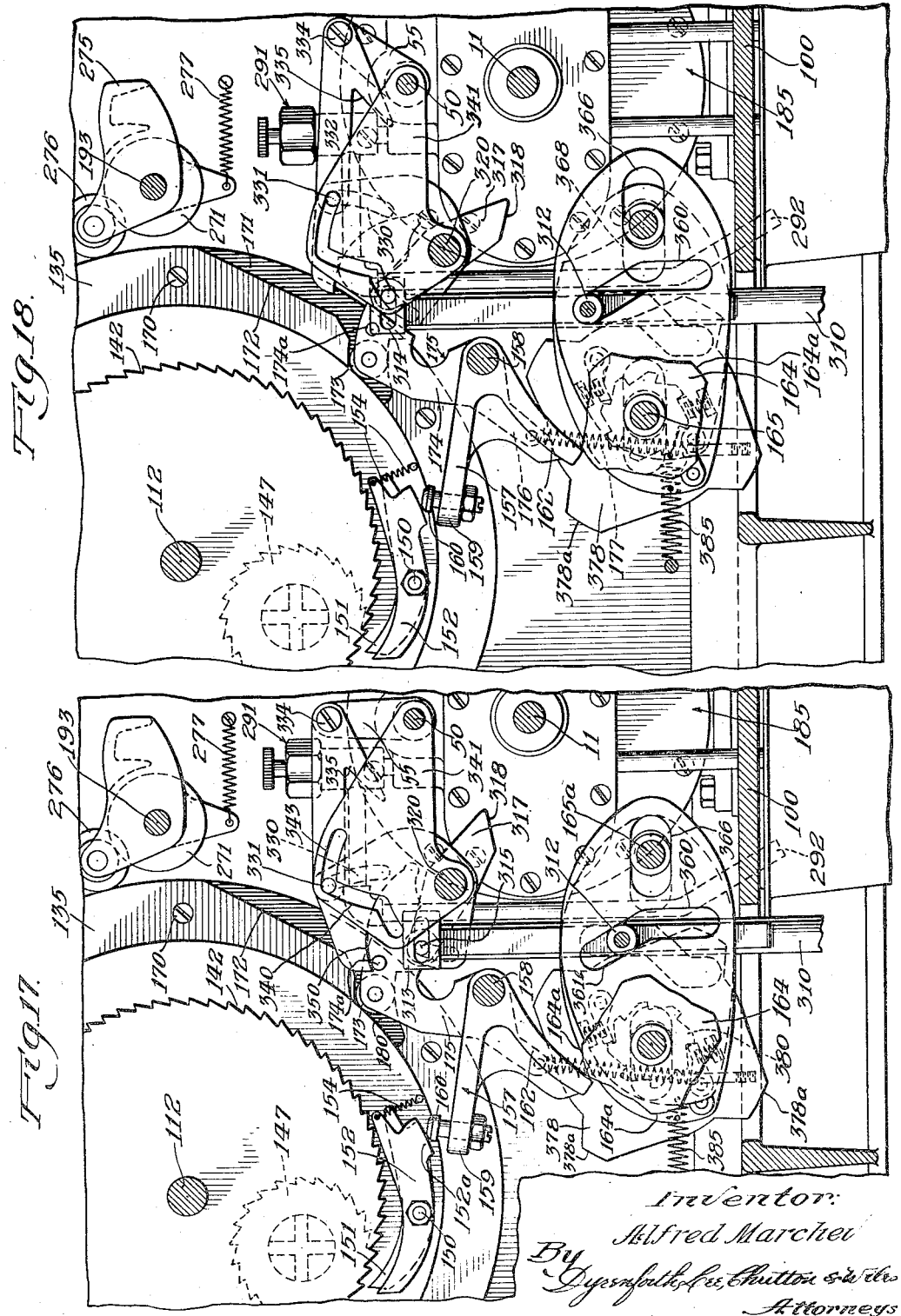
Inventor:
Alfred Marchev
By Dyrenforth, Lee, Chritton & Wiles
Attorneys

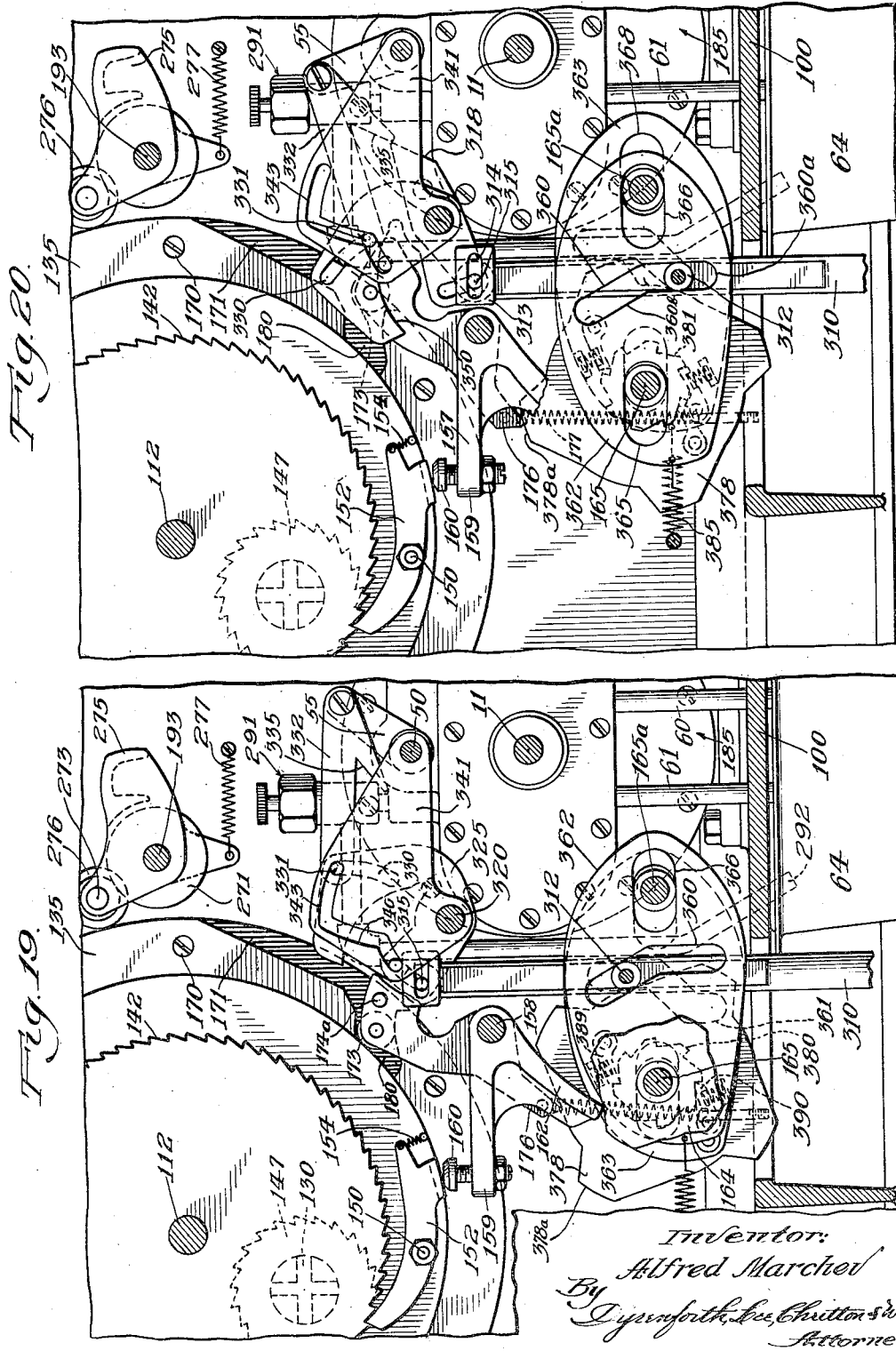

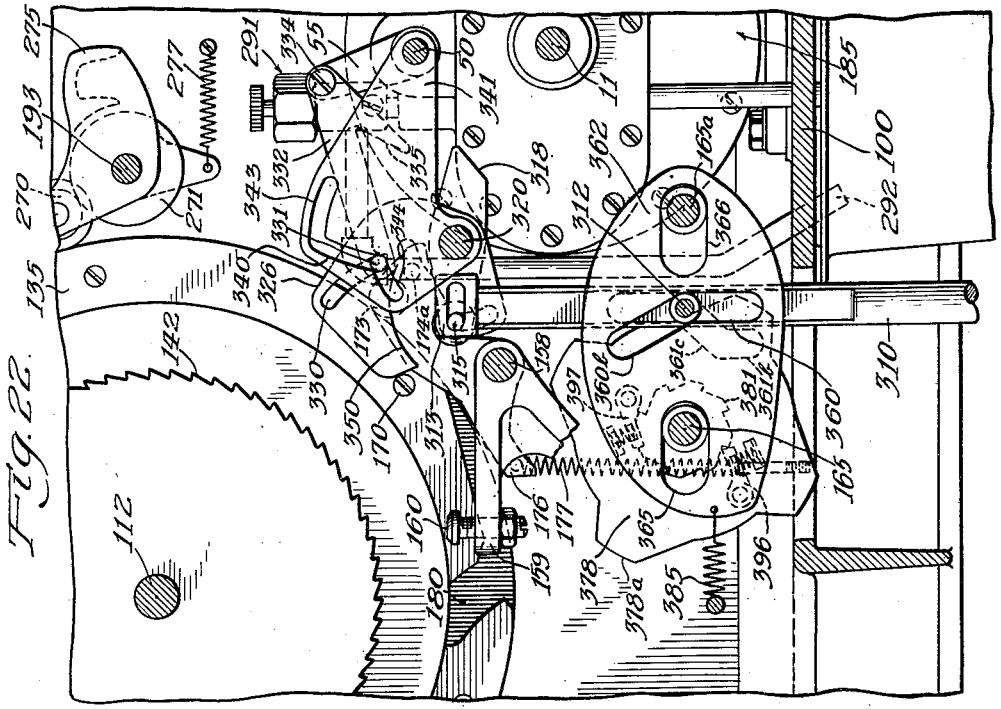
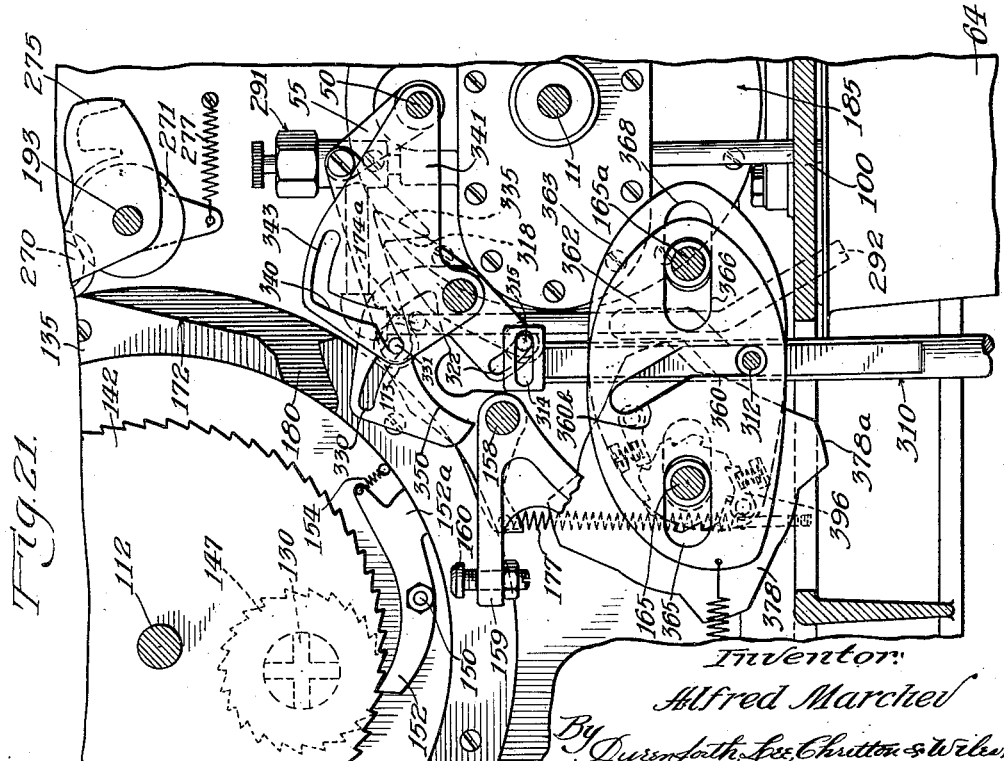

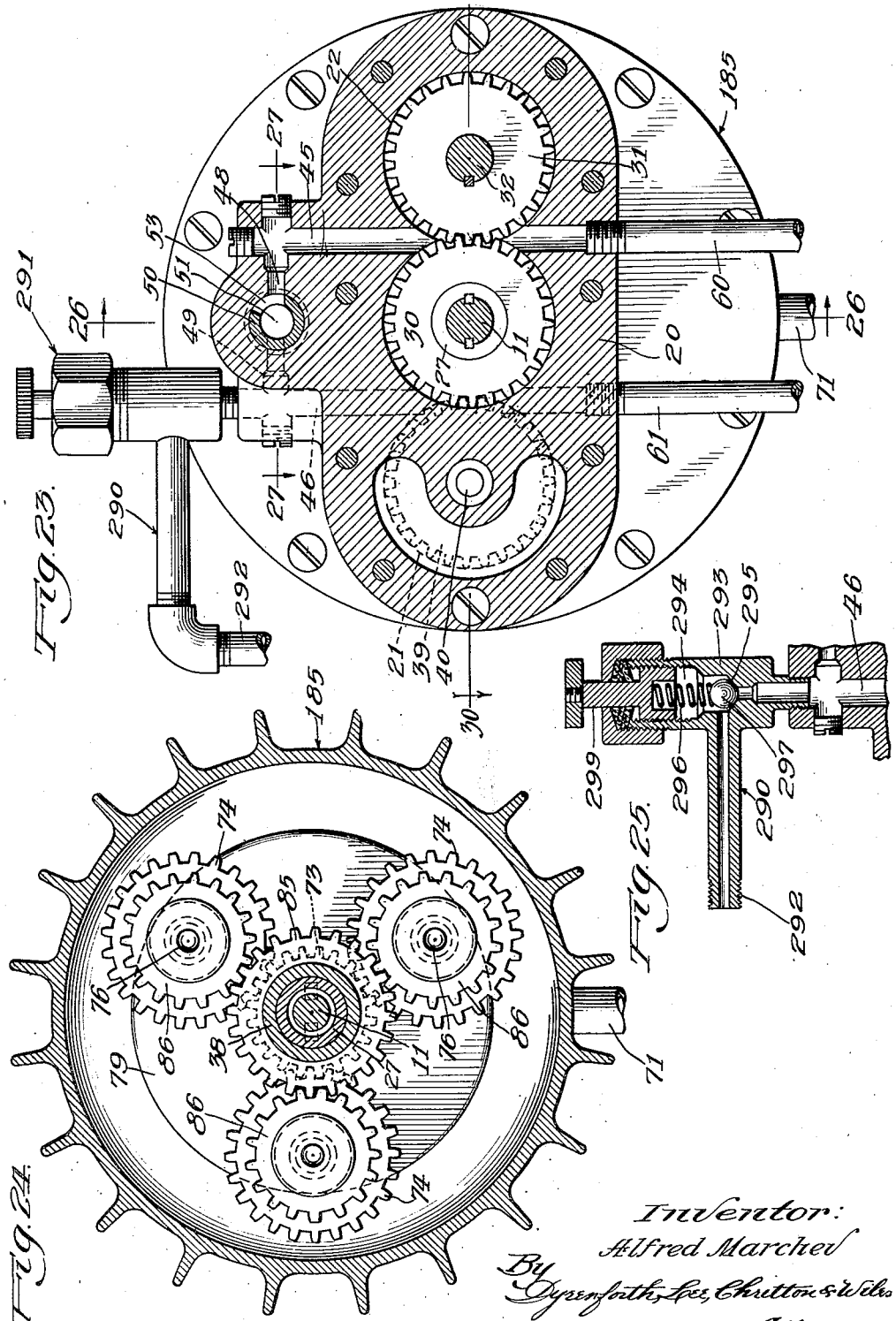

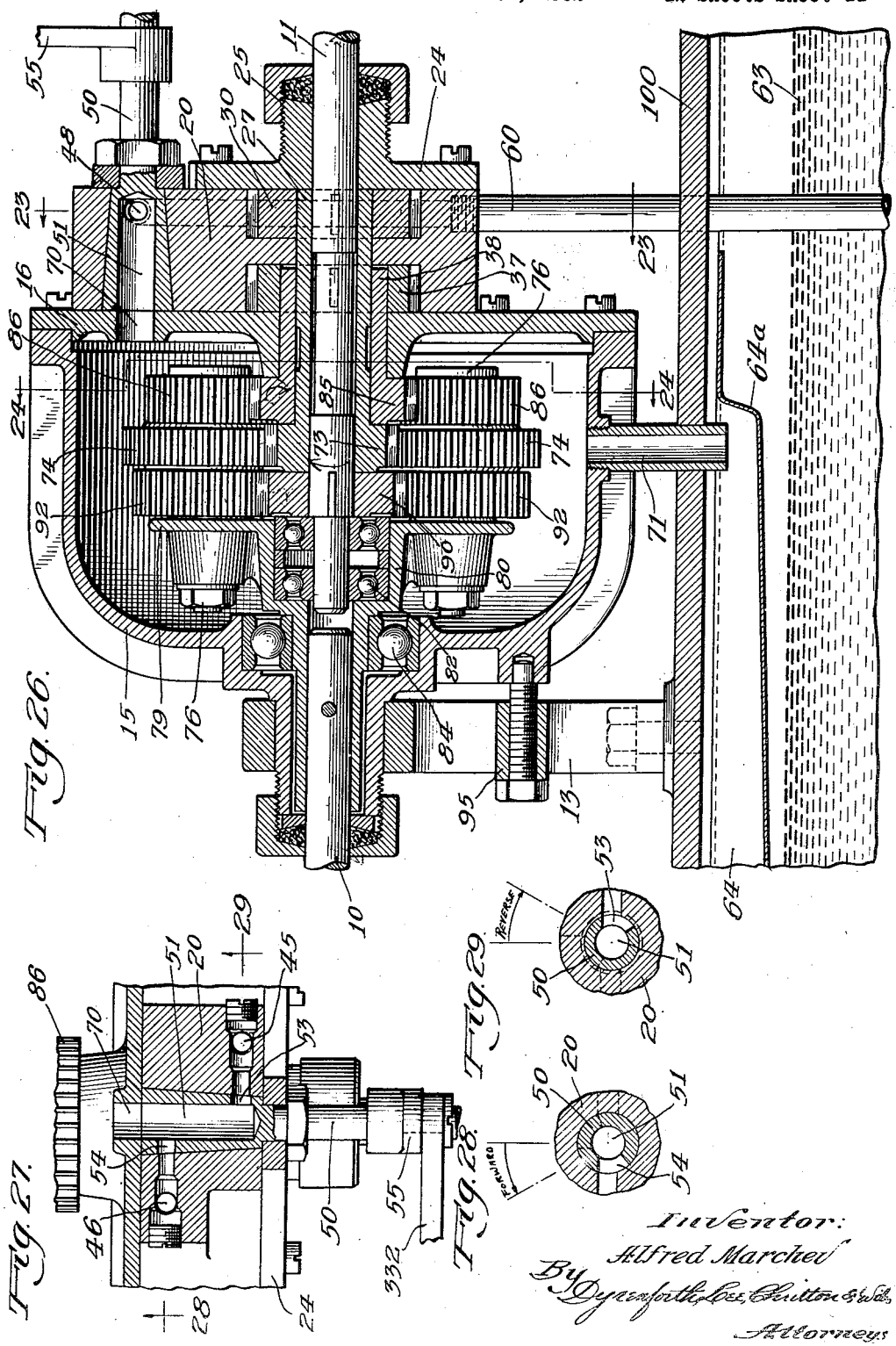

March 5, 1935.  A. MARCHEV  1,993,557
DUPLICATING MACHINE
Filed Oct. 31, 1932  12 Sheets-Sheet 12
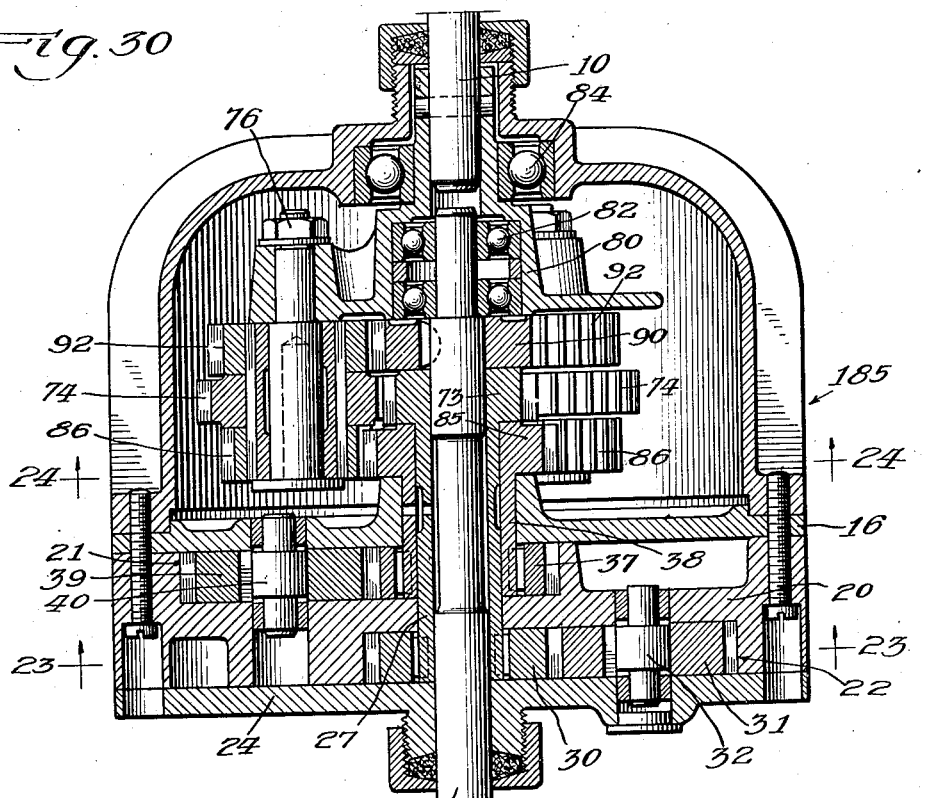
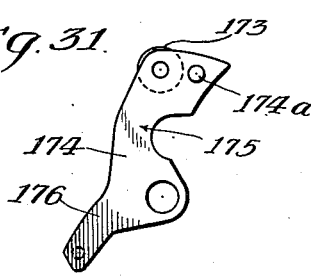
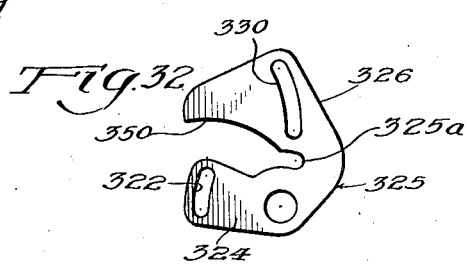
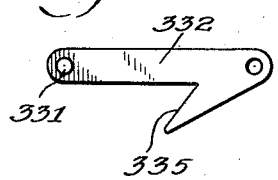
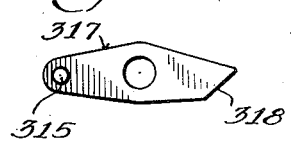
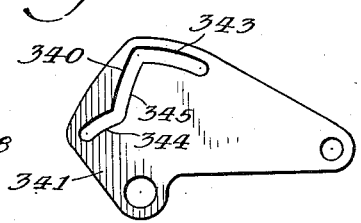
Inventor:
Alfred Marchev
By Dyrenforth, Lee, Chritton & Wiles
Attorneys Patented Mar. 5, 1935

1,993,557

UNITED STATES PATENT OFFICE 1,993,557

DUPLICATING MACHINE

Alfred Marchev, La Grange, Ill., assignor to Ditto Incorporated, a corporation of West Virginia Application October 31, 1932, Serial No. 640,560

51 Claims. (Cl. 101—132)

The invention relates primarily to duplicating machines of the hectograph type although certain features of the invention may be employed with advantage in duplicating machines of other types and in printing devices as a general class.

The primary object of the present invention is to provide an improved duplicating machine of the hectograph type which is adapted particularly to be employed in making copies of an impression on sheets of paper of different sizes. Thus, the machine is adapted particularly to duplicate sales data, cost data, engineering data, and other statistics on forms which may or may not be of the same size. Oftentimes, a relatively small number of duplicate copies are made and therefore it is essential that a machine handling this class of work must operate rapidly and largely automatically if the work is to be done economically.

One form of the invention is embodied in a hectograph duplicator of the rotary type. It comprises a rotatable duplicating or platen cylinder in which two spindles are journaled. A duplicating or gelatinized band has its ends secured to the spindles, an intermediate portion of the band being drawn taut against the duplicating surface of the cylinder. Improved means are provided for feeding sheets to be duplicated to the gelatinized surface and for stripping them therefrom. The improved machine is preferably driven by an electric motor, or the equivalent, which is connected to the operating mechanism through a variable speed transmission, the transmission being preferably of the hydraulic type. The operation and speed of the machine is preferably controlled by a foot treadle. Means controlled by the foot treadle are provided for locking the duplicating or platen cylinder against rotation and for advancing the duplicating band and drawing it taut on the duplicating surface of the duplicating or platen cylinder.

In the illustrated form of the invention, the master sheets and the sheets to be duplicated are fed manually to the improved feed mechanism which advances them automatically at the proper times to the gelatinized surface. All of the other operations are substantially automatic and are controlled by the foot treadle. Obviously the operator has both hands free to select forms, etc., from spaced piles thereof.

Other objects and advantages will become apparent as the following description progresses, reference being had to the accompanying drawings, wherein—

Figure 1 is a front elevation of a duplicating machine which embodies the invention.

Figure 2 is a section taken on line 2—2 of Figure 1.

Figure 3 is a plan view of the improved machine.

Figure 4 is a vertical section taken on line 4—4 of Figure 3.

Figure 5 is a fragmentary side elevation of the improved machine and illustrates the construction of the handle whereby the machine may be operated.

Figure 6 is a fragmentary section taken on line 6—6 of Figure 3.

Figure 7 is a fragmentary section taken on line 7—7 of Figure 5.

Figure 8 is a section taken on line 8—8 of Figure 2.

Figure 9 is a plan section taken on line 9—9 of Figure 2.

Figure 9a is a section taken on line 9a—9a of Figure 9.

Figure 10 is a section taken on line 10—10 of Figure 9.

Figure 11 is a fragmentary section taken on the same line as Figure 14, but showing certain parts in changed positions.

Figure 12 is a fragmentary section taken on the same line as Figure 14, but showing certain parts in changed positions.

Figure 13 is a fragmentary elevation of a foot treadle mechanism whereby the operation of the improved machine is controlled.

Figure 14 is a section taken on line 14—14 of Figure 1.

Figure 15 is a section taken on the same line as Figure 14, but showing certain parts in changed positions.

Figure 16 is a section taken on line 16—16 of Figure 1.

Figures 17, 18, 19, 20, 21 and 22 are fragmentary sections taken on the same line as Figure 16, but illustrating various parts of the mechanism in changed positions.

Figure 23 is a section taken on line 23—23 of Figure 26 and illustrates certain details of a power transmission device through the medium of which the improved machine is operated.

Figure 24 is a section taken on line 24—24 of Figure 26.

Figure 25 is a fragmentary section taken through a pressure regulating valve associated with the power transmission device.

Figure 26 is a longitudinal section taken through the power transmission device, the section being taken on line 26—26 of Figure 23.

Figure 27 is a section taken on line 27—27 of Figure 23.

Figure 28 is a fragmentary section taken on line 28 of Figure 27.

Figure 29 is a fragmentary section taken on line 29 of Figure 27.

Figure 30 is a section taken on line 30—30 of Figure 23.

Figure 31 is a side elevation of a bell crank lever forming part of the improved machine.

Figure 32 is a side elevation of a bell crank lever which forms another part of the improved machine.

Figure 33 is a side elevation of a link forming another part of the improved machine.

Figure 34 is a side elevation of a cam lever forming part of the improved machine, and Figure 35 is a side elevation of a plate which is provided with a cam slot and forms still another part of the improved machine.

Referring to the drawings wherein a preferred embodiment of the invention is illustrated, the reference character 100 designates a base plate supported by standards, portions of which are shown at 101 in Figures 1 and 16. Rigidly secured to the base plate 100 are side plates 103, 104 which, together with the base plate 100 and a bracket 105 constitute the frame of the improved machine. The bracket 105 extends between the side plates 103 and 104 and is rigidly secured thereto. (See Figures 1 and 2.) Extending between the side plates 103 and 104 and rigidly secured thereto, is a shaft 107 which functions as a tie rod and also as a bearing for a pivoted feeding tray 108. (See Figures 1, 2, 11 and 12.)

110 designates an impression or duplicating cylinder which is rotatably journaled upon pins or trunnions 111 and 112 projecting inwardly from the side plates 104 and 103, respectively. (See Figures 2 and 8.) The duplicating cylinder 110 may be of any suitable construction, but preferably comprises cup shaped end plates 115 and 116 between which an arcuate sheet metal member 117 extends, the arcuate member 117 being concentric with the axis of rotation of the cylinder 110. (See Figure 8.) As best shown in Figure 14, the arcuate member 117 extends only part way around the circumference of the cylinder 110 so that an opening 120 is left in the cylinder through which rolls of duplicating bands may be inserted. A duplicating band is shown at 122, one end of the band being secured to a spindle 123 and the other end of the band being secured to a spindle 124. It will be noted that the band 122 is drawn taut around the outside surface of the arcuate member 117 and preferably presents a gelatinized duplicating surface upon which impressions may be made from a master sheet, or the equivalent, copies being made subsequently from said impression in a manner well known to those skilled in the art.

The spindles 123 and 124 are preferably identical in construction. One end of each spindle is provided with a pin 127 adapted to be inserted in a bore 128 formed in the inner end of a screw 129 screw-threaded through the cup shaped member 116. The other end of each spindle is provided with longitudinally projecting lugs 130 engageable with grooves 131 formed in a collar 132 fixed to a stub shaft. The collar 132 associated with the spindle 123 is fixed to a stub shaft 133, the collar 132 associated with the spindle 124 being fixed to a stub shaft 134. The stub shafts 133 and 134 are rotatably mounted in the cup shaped member 115. It will be readily understood that when the stub shafts 133 and 134 are rotated, the spindles 123 and 124 will also rotate.

The spindles 123 and 124 may be removed from the duplicating cylinder 110 by unscrewing the screws 129 until the pins 127 may be disengaged from the bores 128. Therefore, the spindles 123 and 124 and the duplicating band 122 may be replaced at any time.

Secured to the outer side of the cup shaped member 115 is a cam 135 and secured to the outer side of the cup shaped member 116 is a cam 136. A cam 137 is secured to the outer side of the cam 136. The functions of the cams 135, 136 and 137 will be described below.

As best shown in Figure 8, a hub 140 is rotatably journaled on the pin or trunnion 112. Secured to the outer side of the hub 140 is a sprocket 141 and secured to the inner side of the hub 140 is a ratchet 142. Constrained to rotate with the hub 140, and therefore with the sprocket 141 and the ratchet 142, is a gear 144 which meshes with a gear 145 fixed to the stub shaft 133. A ratchet 147 is fixed to the stub shaft 134.

Projecting from the cup shaped member 115 of the duplicating cylinder 110 is a stub shaft 150 upon which pawls 151 and 152 are pivoted. The pawls 151 and 152 co-operate with the ratchets 147 and 142, respectively. It will be noted that the pawls 151 and 152 rotate bodily with the duplicating cylinder 110 around its axis of rotation. The pawls 151 and 152 are urged yieldingly into engagement with the ratchets 147 and 142, respectively, by springs 154.

Means is provided for disengaging the pawls 151 and 152 from their respective ratchets. This means preferably comprises a bell crank lever 157 pivoted on a shaft 158 which extends between the side frames 103 and 104. An arm 159 of the bell crank lever 157 is provided with a pin 160 which may be brought into engagement with the pawls 151 and 152 to displace them angularly in a counterclockwise direction (Figures 2 and 17 to 22, inclusive) so that they will be disengaged from their respective ratchets. The pin 160 is screw-threaded into the arm 159 and may be secured in a plurality of adjusted positions. Another arm 162 of the bell crank lever 157 is engageable by a cam 164 rotatably journaled on a stub shaft 165 which projects inwardly from the side plate 104.

It may be mentioned at this point in the description that the bell crank lever 157 tends to gravitate into a position wherein the pin 160 will not engage the pawls 151 and 152. The purpose of this construction will presently appear.

As illustrated in Figures 17 to 22, inclusive, the cam 135 is in the form of a flat ring secured to the cup shaped member 115 by screws 170. A cam slot 171 is milled in the outer face of the cam 135. The cam slot 171 has a cam surface 172 engageable by a roller 173 rotatably journaled on an arm 174 of a bell crank lever 175 which has another arm 176. The bell crank lever 175 is pivoted on the shaft 158 (see Figure 31) and is urged yieldingly in a counter-clockwise direction (Figures 17 to 22, inclusive) by a spring 177. The inner end of the cam surface 172 terminates in a slot 180 into which the roller 173 may ride to lock the duplicating cylinder 110 against rotation. It will be noted that the arm 174 is provided with a pin 174a (see Figure 31). The function of the pin 174a will be described below.

As best shown in Figure 2, a sprocket chain 182 operatively connects the sprocket 141 with a sprocket 183 fixed to a shaft 11 which is driven by a transmission device 185, the transmission device being driven, in turn, by an electric motor 186 mounted on the base plate 100. (See Figures 1 and 3.) The motor 186 is provided with a shaft 187 which is operatively connected by a coupling device 188 to a shaft 10 forming part of the transmission device 185. It will be noted that the transmission device 185 is also supported upon the base plate 100.

The sprocket chain 182 is trained over sprockets 190 and 191 secured to shafts 193 and 194, respectively. A sprocket 195 fixed to the shaft 193 adjacent the side frame 103 is operatively connected to a sprocket 197 by a sprocket chain 198. (See Figures 2 and 3.) The sprocket 197 is secured to a shaft 199 rotatably journaled in the side frames 103 and 104.

The shaft 194 is rotatably journaled in the side frame 104. (See Figure 7.) The outer end of the shaft 194 is provided with a crank or handle 200, the handle 200 being provided with a hub 201 journaled on the shaft 194. A spring pressed ball 203 mounted in a bore 204 is engageable with annular grooves 205 and 206 formed in the shaft 194. Formed integral with the hub 201 are clutch jaws 207 engageable with a clutch member 208 pinned to the shaft 194. When the ball 203 rides in the annular groove 206, the handle 200 may be rotated without rotating the shaft 194, but if the handle 200 is displaced to the left (Figure 7) so that the ball 203 rides in the annular groove 205, the jaws 207 will engage the clutch device 208 and rotation of the handle 200 will result in rotation of the shaft 194 and it, it turn, will drive all of the mechanism operatively connected to the sprocket chain 182. Generally, the improved machine is driven through the medium of the handle 200 only when the gelatine band 122 is being mounted on the duplicating cylinder 110. However, it will be readily understood that if it is so desired, the improved machine may be operated manually through the medium of the handle 200 during the duplicating or printing operations.

Referring now to Figures 2, 11 and 12, the feeding tray 180 is urged yieldingly in a counterclockwise direction by a spring 215. A roller 216 rotatably journaled on a pin 217 projecting from the tray 180 rides upon the cam 137. When the roller 216 rides upon a dwell 218 provided upon the cam 137, the tray or table 108 is held in the position wherein it is shown in Figures 2 and 12. The remaining portion of the cam 137 is of smaller diameter as indicated at 240 in Figure 11 and permits the spring 215 to bring the feeding tray or table 180 into a position wherein its free or forward end rests in an angle shaped stop member 242 which is rigidly secured to the bracket 105 by screws 243.

Rotatably journaled in the bracket 105 is a metal feed roll 245, the surface of which is preferably knurled. A gear 246 constrained to rotate with the feed roll 245 meshes with a gear 247 fixed to the shaft 199. Co-operating with the feed roll 245 is a feed roll 248 preferably formed from rubber. The feed roll 248 is mounted on a shaft 249 which is journaled in spaced arms 250 of a bracket member 251 pivoted on the shaft 199. The bracket member 251 comprises an arcuate bar 253 which extends between the arms 250. The bracket member 251 also comprises a lever 255 which, at its free end, is provided with a roller 256 engaging the cam 136. A spring 255a yieldingly urges the roller 256 into contact with the cam 136.

When copies are being made of an impression on the duplicating band 122, the sheets of paper for the copies are fed manually and singly onto the feeding tray 180 at substantially any time the tray has its forward end resting in the angle shaped stop member 242. The forward end of the tray is in this position during most of each cycle of rotation of the duplicating cylinder 110. In the present instance, the forward end of the feeding tray is resting in the stop member 242 as illustrated in Figure 11 throughout about 270° of each cycle of rotation of the duplicating cylinder 110. Therefore, it will be readily understood that substantially so soon as one sheet of paper has been advanced from the feeding tray to the duplicating cylinder, the operator may place the following sheet in the feeding tray.

Assuming that a sheet of paper has been placed in the feeding tray and that its forward edge is resting against the stop member 242 as illustrated in Figure 11 wherein the paper is shown at 260, it will be readily understood that when the dwell 218 of the cam 137 engages the roller 216, the feeding tray 108 will be displaced in a clockwise direction (Figure 11) against the action of the spring 215 and the feeding tray 108 will be brought into the position wherein it is shown in Figures 2 and 12 so that the sheet of paper 260 will gravitate toward the feed rolls 245 and 248 which, at that instant, are spaced from each other as illustrated in Figures 6 and 14. The forward end of the paper passes between the feed rolls 245 and 248 and abuts against spaced lugs 263 provided upon the bracket 105. The spaced lugs 263 form margin stops and therefore the bracket 105 may be referred to as the margin member. In Figure 4, the forward end of the paper 260 is shown in dotted lines abutting against one of the lugs or margin stops 263. After the paper has come to rest against the margin members 263, the cam 136 displaces the roller 256 and the lever 255 in a clockwise direction (Figure 2) so that the bracket member 251 displaces the feed roll toward the feed roll 245. The paper is then gripped between the feed rolls 245 and 248 and advanced by them over a curved surface 265 provided upon the bracket member 105. The forward end of the paper comes into engagement with an impression or platen roller 267 fixed to the drive shaft 199, the machine being preferably adjusted so that the forward end of the paper passes over the platen roller 267 before the forward end of the duplicating surface on the cylinder 110 comes into registery with the platen roller. (See Figure 12.) This leaves a portion of the paper 260 projecting beyond the duplicating surface and provides a margin thereon. This projecting portion of the paper is substantially utilized when the paper is to be stripped from the gelatinized surface.

The platen roller 267 and the gelatine band 122 co-operate to press the paper into contact with the impression on the gelatinized surface and the duplicating operation takes place in a manner well known to those skilled in the art.

The means for stripping the duplicated sheet from the gelatine band 122 preferably comprises a knurled metal roller 270 and a rubber roller 271. The rubber roller 271 is mounted on the drive shaft 193 and rotates therewith. The roller 270 is driven by the roller 271 and is mounted on a shaft 273 journaled in spaced arms 274 of a bracket member 275 pivoted upon the shaft 193. A roller 276 mounted on one end of the shaft 273 rides upon the cam 137 and is urged into contact therewith by a spring 277 which yieldingly urges the bracket member 275 in a counter-clockwise direction (Figures 14 and 15). As long as the opening 120 of the duplicating cylinder 110 is presented to the rollers 270 and 271, the cam 137 permits the rollers 270 and 271 to occupy the positions wherein they are shown in Figure 15 so that they will be engaged by the forward end of the duplicated sheet as it is carried around with the gelatine band. (See Figure 15.) The roller 270 is driven in a counter-clockwise direction (Figure 15) by the roller 271 and it deflects the forward end of the duplicated sheet so that it passes between the rollers 270 and 271 and they advance it toward a deflecting member 278. Meanwhile, the cam 137 displaces the roller 276 and the bracket member 275 to bring the rollers 270 and 271 into the positions wherein they are shown in Figure 14 so that the duplicated sheet is fed to a tray 280 detachably secured to the side plates 103 and 104 by pins 281 which engage notches 282 provided in the side plates. So soon as the paper has been stripped from the gelatinized surface, the rollers 270 and 271 return to the positions wherein they are shown in Figure 15. It will be readily understood that when the rollers 270 and 271 swing from the positions wherein they are shown in Figure 15 to the positions wherein they are shown in Figure 14, they assist in stripping the duplicated sheet from the gelatinized surface.

The power transmission device 185 is preferably of the hydraulic type and is described in detail in a co-pending application, Serial No. 623,843, filed July 21, 1932 by Rudolph Weide.

The transmission device comprises a cup shaped housing 15, the open end of which is closed by a plate 16. Rigidly secured to the plate 16 is a combined pump and valve housing member 20 provided with pump chambers 21 and 22, the inner end of the pump chamber 21 being closed by the plate 16 and the outer end of the chamber 22 being closed by a plate 24 which forms part of a stuffing box 25 through which the shaft 11 extends.

Disposed in the chamber 22 and keyed to a sleeve 27 is a gear 30 which meshes with a gear 31 keyed to a shaft 32. A gear 37 disposed in the pump chamber 21 is keyed to a sleeve 38 which is rotatably journaled on the sleeve 27 and in the plate 16. The gear 37 meshes with a gear 39 which is keyed to a shaft 40. The housing member 20 is provided with vertically extending bores 45 and 46, the bores being arranged so that the gears 30 and 31 mesh within the bore 45 and the gears 37 and 39 mesh within the bore 46. The gears 30 and 31 form a pump for advancing liquid through the bore 45 and the gears 37 and 39 form a pump for advancing liquid through the bore 46. The upper ends of the bores 45 and 46 terminate in horizontal bores 48 and 49, respectively. The inner ends of the bores 48 and 49 terminate at a valve device 50 having a bore 51 formed therein. The valve device 50 is provided with ports 53 and 54 which may be brought into registry with the bores 48 and 49, respectively, by angularly displacing the valve member 50. Secured to the valve member 50 is a lever 55. When the lever 55 is in its neutral or vertical position (see Figure 17), the ports 53 and 54 communicate with the bores 48 and 49, respectively.

When the handle 55 is displaced angularly in a counter clockwise direction (Figures 17 and 20) from the position wherein it is shown in Figure 17 to the position wherein it is shown in Figure 20, the port 54 communicates with the bore 49 and the port 53 is moved out of registery with the bore 48. The shaft 11 is then driven in the same direction as the shaft 10. When the handle 55 is displaced in a clockwise direction (Figures 17 and 18) from the position wherein it is shown in Figure 17 to the position wherein it is shown in Figure 18, the port 53 communicates with the bore 48 but the port 54 does not communicate with the bore 49. The shaft 11 is then driven in a direction opposite to that in which the shaft 10 is rotated.

Screw-threaded into the lower ends of the bores 45 and 46 are pipes 60 and 61, respectively, which project into a supply of lubricant 63 contained in a vat 64 disposed beneath the base plate 100. The bore 51 in the valve member 50 communicates with the interior of the housing 15 through an aperture 70 formed in the plate 16. As its lower end the housing 15 is provided with a drain pipe 71 which empties into the vat 64. The construction is such that when lubricant is being pumped from the vat 64 by either or both of the pump devices disposed in the housing member 20, the lubricant will flow from the vat 64 up through one or both of the pipes 60 and 61 and will be returned to the vat through the drain 71. The lubricant will lubricate planetary gearing, etc., disposed in the housing 15.

The planetary gearing comprises a sun gear 73 formed integral with the sleeve 27 and meshing with three planet gears 74 keyed to sleeves 75 which are rotatably journaled on pins 76, the pins 76 being rigidly secured to hubs 78 formed integral with a plate 79. The plate 79 is provided with a central hub 80 which has its outer end pinned to the drive shaft 10 and has its inner portion journaled on ball bearings 82 disposed between the hub 80 and the shaft 11. A ball bearing 84 is disposed between the outer end of the hub 80 and the housing 15.

A sun gear 85 formed integral with the sleeve 38 meshes with planet gears 86 keyed to the sleeves 75 and another sun gear 90 keyed to the shaft 11 meshes with planet gears 92 which are also keyed to the sleeves 75.

In the present instance, the sun and planet gears 90 and 92 are each provided with 24 teeth. The sun gears 73 and 85 are provided with 21 teeth and 27 teeth, respectively. The plant gears 74 and 86 are provided with 27 teeth and 21 teeth, respectively.

The housing 15 is held against rotation around the longitudinal axes of the shafts 10 and 11 by a bolt 95 which is screw-threaded through a bearing bracket 13 and projects into the housing 15. The bearing bracket 13 is rigidly secured to the base plate 100.

A baffle plate 64a is preferably provided in the vat 64 so that lubricant which is returned to the vat through the drain pipe 71 will be discharged into the vat at a point spaced from the pipes 60 and 61. This insures that there will be a circulation of lubricant in the vat.

The operation of the transmission device 185 is as follows: If it is assumed that the shaft 10 is being driven by the electric motor 186 and that the lever 55 is in its neutral or vertical position, it will be readily understood that substantially the same amount of lubricant will be pumped through the housing 15 by the gears 30 and 31 as is pumped through the housing 15 by the gears 37 and 39. Therefore, the pump which comprises the gears 30 and 31 will not hold the sleeve 27 against rotation with any force greater than the force which is exerted by the gears 37 and 39 on the sleeve 38 to keep it from rotating. The sleeves 75 are constrained to rotate bodily with the shaft 10 around its axis of rotation and the planet gears 92 will roll around the sun gear 90 without driving it. The sun gears 73 and 85 are driven in opposite directions, the relative angular displacement of the sun gears in opposite directions being such that they equalize each other and permit the planet gears 92 to roll around the sun gear 90 without driving it. Now, if the lever 55 is displaced angularly in a counter-clockwise direction to the position wherein it is shown in Figure 20, the port 54 will communicate with the bore 49 and the port 53 will be disconnected from the bore 48. Obviously, the gears 30 and 31 will be held against rotation as they simply hold a head of lubricant in the bore 48 and the upper portion of the bore 45. As the gear 30 is keyed to the sleeve 27, the sleeve 27 will be held against rotation around the longitudinal axes of the shafts 10 and 11 and the planetary gearing will function to drive the shaft 11 in the same direction as the shaft 10, the speed of the shaft 11 being determined by the proportions of the gears which constitute the planetary gearing. In this instance, the maximum speed of the shaft 11 is approximately one-fourth of the speed of the shaft 10. The speed of the shaft 11 may be lowered as much as desired by angularly displacing the lever 55 in a clockwise direction from the position wherein it is shown in Figure 20. As the lever 55 is displaced in a clockwise direction (Figure 20), the port 53 will be brought more and more into registry with the bore 48 so that more and more lubricant will be forced therethrough by the gears 30 and 31. The greater the amount of lubricant pumped through the port 53 by the gears 30 and 31, the less will be the retarding effect these gears have on the sleeve 27 and the sun gear 73 will rotate at a speed approximately proportional to the ratio of the amount of lubricant pumped by the gears 30 and 31 to the amount of lubricant pumped by the gears 37 and 39. It is more accurate to state that the gear 73 will rotate at a speed which is proportional to the ratio of the force retarding the gear 30 to the force retarding the gear 37.

If the lever 55 is displaced in a clockwise direction to bring it to the position wherein it is illustrated in Figures 18 and 19, the port 53 will communicate with the bore 48, but the port 54 will not communicate with the bore 49. This will prevent the gears 37 and 39 from rotating and the sun gear 85 will be held against rotation around the longitudinal axes of the shafts 10 and 11. The shaft 11 will then rotate at its maximum speed in a direction opposite to that in which the shaft 10 rotated. To reduce the speed of the shaft 11, it is only necessary to displace the lever 55 toward its neutral or vertical position so that sufficient lubricant passes through the port 54 to permit the sun gear 85 to rotate at a speed which will result in the rotation of the shaft 11 at the desired speed.

For a purpose hereinafter explained, the bore 46 is provided with by-pass means which is designated generally by the reference numeral 290. Thus, the upper end of the bore 46 communicates through a relief or pressure regulating valve device 291 with a pipe line 292 which discharges into the vat 64. The valve device 291 comprises a valve housing 293 screw-threaded into the upper end of the bore 46 and provided with a valve chamber 294 which terminates at its lower end in a valve seat 295. Yieldingly urged against the valve seat 295 by a spring 296, is a ball 297. The tension of the spring 296 may be adjusted through the medium of a stem 299 screw-threaded into the upper end of the valve chamber 294. In the event the pressure in the bore 46 rises above a predetermined maximum, the spring 296 will permit the ball 297 to be lifted from the seat 295 so that lubricant will flow from the bore 46 through the pipe line 292 to the vat 64.

The lever 55 for controlling the valve 50 is operatively connected to a foot treadle 300 pivoted on a pin 301, the pin 301 being mounted in a bracket 302 which is secured to the floor, or the equivalent, upon which the improved machine stands. The foot treadle 300 is pivoted intermediate its ends and is provided at one end with a heel plate 305. The toe of the operator will rest upon the other end 306 of the treadle. This construction permits the operator to oscillate the foot treadle 300 around the pin 301. A link 309 has one end pivoted to the treadle 300 adjacent the toe end thereof, the other end of the link 309 being pivoted to the lower end of a vertically disposed rod 310 which is slidably journaled in the base plate 100. (See Figure 1.) Intermediate its ends, the rod 310 is provided with anti-friction rollers 312 and 312a and at its upper end the rod is provided with a head 313, the head 313 being provided with a horizontally extending slot 314. (See Figures 16, 19 and 20.) Projecting into the slot 314 is a pin 315 fixed to one end of a cam lever 317, the other end of the cam lever 317 being provided with a cam surface 318. The cam lever 317 is pivoted intermediate its ends on a stub shaft 320 projecting inwardly from the side frame 104.

The pin 315 also rides in a slot 322 formed in an arm 324 of a bell crank lever 325 provided with a second arm 326. The bell crank lever 325 is pivoted on the stub shaft 320. The slot 322 is concentric with the longitudinal axis of the stub shaft 320. The arm 326 is provided with a curved slot 330 in which a pin 331 rides. The pin 331 projects from one end of a link 332 which has its other end pivoted to the free end of the lever 55 by a pin 334. The link 332 is provided with a lug 335 which is engageable by the cam surface 318.

The pin 331 also rides in a slot 340 formed in a plate 341 mounted on the stub shaft 320 and on the outer end of the valve member 50. As best shown in Figure 35, the slot 340 comprises arcuate portions 343 and 344 and a portion 345 which is intermediate the arcuate portions 343 and 344.

The arm 326 of the bell crank lever 325 is provided with a cam surface 350 which is engageable by the pin 174a carried by the bell crank lever 175.

The anti-friction rollers 312 and 312a ride in cam slots 360 and 361, respectively, provided in plates 362 and 363, respectively. The plate 362 is provided with horizontally extending slots 365 and 366. (See Figure 20.) The plate 363 is provided with horizontally extending slots 367 and 368. (See Figure 10.)

The stub shaft 165 projects through the slots 365 and 367 and a second stub shaft 165a projects through the slots 366 and 368. Mounted on the stub shaft 165a is a sleeve 370 which extends through the slots 366 and 368 and slidably journals the right hand ends (Figures 9, 10 and 20) of the plates 362 and 363. Extending through the slot 365 is a collar 373 constrained to rotate with the cam 164. The collar 373 slidably journals the left hand end (Figure 9) of the plate 362. Projecting through the slot 367 is a collar 375 which slidably journals the left hand end (Figure 9) of the plate 363. The collar 375 is fixed to a cam 378 rotatably journaled on the stub shaft 165.

Disposed between the plates 362 and 363 and mounted on the collars 373 and 375 are ratchets 380 and 381, respectively.

The ratchets 380 and 381 are both shown in Figures 1 and 9. To facilitate the description of the operation of the improved machine, the ratchet 380 is shown in dotted lines in Figures 16 to 19, inclusive, the ratchet 381 being shown in dotted lines in Figures 20 to 22, inclusive. The ratchet 381 is shown in full lines in Figure 10, this section being taken behind the ratchet 380.

Springs 385 yieldingly urge the plates 362 and 363 to the left (Figure 9).

The cam slot 360 in the plate 362 has a vertically extending portion 360a at its lower end and an inclined portion 360b at its upper end. The slot 361 has a vertically disposed portion 361a at its upper end and vertically disposed portion 361b at its lower end. Intermediate its ends, the slot 361 is provided with an inclined portion 361c.

Co-operating with the ratchet 380 and pivoted to the plate 362 are pawls 389 and 390, these pawls being shown in dotted lines in Figures 16 to 19, inclusive, and in full lines in Figure 9a. Springs 391 yieldingly urge the pawls 389 and 390 into engagement with the ratchet 380.

Associated with the ratchet 381 and pivoted to the plate 363 are pawls 395 and 396 which are yieldingly urged toward the ratchet 381 by springs 397.

Referring now to Figures 17 and 18, it will be noted that the pawl 152 is provided with a lug 152a which engages the pin 160. The construction is such that when the pawls 151 and 152 are angularly displaced in a counter-clockwise direction (Figures 16 and 17) by the pin 160, the pin 160 engages the lug 152a before it engages the pawl 151 and therefore, the pawl 152 is disengaged from the ratchet 142 before the pawl 151 is disengaged from the ratchet 147. When the pin 160 is displaced in a downward direction, it permits the pawl 151 to engage the ratchet 147 before the pawl 152 engages the ratchet 142.

As stated above, the bell crank lever 157 which carries the pin 160 has an arm 162 which engages the cam 164. The cam 164 is provided with four projections 164a. When the arm 162 is engaged by one of the projections 164a, the bell crank lever 157 is displaced into a position wherein the pin 160 disengages the pawls 151 and 152 from their respective ratchets.

The arm 176 of the bell crank lever 175 rides upon the cam 378 which is provided with four projections 378a. When the arm 176 rides up on one of the projections 378a, the bell crank lever 175 is displaced in a clockwise direction (Figures 19 and 20) and the roller 173 is withdrawn from the slot 180. This unlocks the duplicating cylinder 110 for rotation.

The operation of the improved machine is illustrated in Figures 16 to 22, inclusive. Figure 16 illustrates the positions of the parts of the operating or control mechanism at the completion of a printing or duplicating operation. This position may also be described as the neutral position. It will be noted that the pawls 151 and 152 are in engagement with their respective ratchets and that the lever 55 is in its vertical or neutral position so that the shaft 11 is not rotated. The anti-friction rollers 312 and 312a are substantially midway between the upper and lower ends of the slots 360 and 361, respectively. The plates 362 and 363 are at their extreme left hand positions. The pin 315 is at the lower end of the slot 322 provided in the bell crank lever 325.

The operation of the mechanism for advancing the duplicating band 122 will now be described, it being assumed that sufficient copies have been made from the impression on that part of the duplicating band which is drawn taut across the arcuate member 117. To advance the duplicating band 122, it is necessary to wind the used portion on the spindle 123 and unwind a clean portion from the spindle 124. To accomplish this, the operator presses his heel downwardly on the foot treadle 300 so that it is displaced in a counter-clockwise direction (Figure 13) and the rod 310 is displaced upwardly. This upward displacement of the rod 310 causes the roller 312 to co-operate with the upper end of the slot 360 to displace the plate 362 toward the right. (Figures 16 and 17.) At the same time, the pin 315 rides upwardly in the slot 322 without displacing the bell crank lever 325. When the plate 362 is displaced toward the right, (Figures 16 and 17) the pawl 390 rotates the ratchet 380 a distance of one tooth so that one of the projections 164a of the cam 164 rides underneath the arm 162 of the bell crank lever 157 whereupon the pin 160 first displaces the pawl 152 and then displaces the pawl 151 so that these pawls are disengaged from their respective ratchets. Figure 17 shows the operating mechanism as it appears after this portion of the operation has been completed.

The operator then continues to press with his heel upon the foot treadle 300 and the pin 315, having reached the upper end of the slot 322, displaces the bell crank lever 325 in a clockwise direction (Figures 17 and 18) and the pin 331 projecting into the slot 330 of the bell crank lever 325 displaces the lever 55 angularly in a clockwise direction until it assumes the position wherein it is shown in Figure 18. As stated above, the displacement of the lever 55 in a clockwise direction causes the shaft 11 to rotate in a direction opposite to that in which the shaft 10 rotates. In this instance, when the lever 55 is displaced in a clockwise direction from its neutral or vertical position, the shaft 11 rotates in a clockwise direction and therefore the sprocket wheel 141, the hub 140, the ratchet 142 and the gear 144 also rotate in a clockwise direction. (Figures 2, 16, 17 and 18.) The gear 144 then rotates the gear 145 in a counter-clockwise direction (Figure 2) so that the spindle 123 is rotated in a counter-clockwise direction (Figure 14) to wind the forward end of the duplicating band 122 around the spindle 123, the band being withdrawn from the spindle 124 which is not locked against rotation as the pawl 151 is held disengaged from the ratchet 147. It is understood, of course, that the roller 173 is holding the duplicating cylinder 110 against rotation during the time the duplicating band is being advanced.

When the operator has advanced a fresh or clean portion of the duplicating band 122 over the outer surface of the arcuate member 117, he releases the pressure on the heel portion of the foot treadle 300 and one of the springs 385 draws the plate 362 to the left (Figures 19 and 20) and the rod 310 gravitates downwardly, the rod 310 being urged downwardly by a surface of the slot 360, which surface engages the anti-friction roller 312. When the plate 362 is displaced to the left, the ratchet 389 rotates the sprocket 380 through a distance of one tooth so that the arm 162 of the bell crank lever 157 falls between two of the projections 164a on the cam 164. This angular displacement of the bell crank lever 157 withdraws the pin 160 from engagement with the pawls 151 and 152. The pawl 151 engages the ratchet 147 before the pawl 152 engages the ratchet 142. Therefore, the spindle 124 is locked against rotation before the spindle 123 ceases to rotate, whereupon the duplicating band 122 is drawn taut across the outer surface of the duplicating cylinder 110. The pawl 152 engages the ratchet 142 before the ratchet 142 ceases to rotate, but, of course, the pawl simply slips over the teeth of the ratchet during the subsequent rotation thereof. The relief or pressure regulating valve 291 is adjusted so that if too much tension is placed upon the duplicating band 122 while it is being drawn taut across the outer surface of the duplicating surface 110, the ball 297 will be lifted from its seat 295 by the fluid pressure in the bore 46, whereupon the shaft 11 will stop and therefore cease to drive the sprocket 141 and the spindle 123. This prevents tearing of the duplicating band.

Figure 19 illustrates the positions the plate 362 and the roller 312 have assumed the instant the pawl 152 engages the ratchet 142. The downward displacement of the anti-friction roller 312 continues until the plate 362 and the roller 312 have assumed the relative positions wherein they are shown in Figure 16. It will be noted that while the roller 312 travels from the position wherein it is shown in Figure 18 to the position wherein it is shown in Figure 19, the pin 315 travels downwardly in the slot 322 of the bell crank lever 325. In Figure 19 the pin 315 has engaged the lower end of the slot 322 and continued downward displacement of the rod 310, and the pin 315, causes the pin 315 to displace the bell crank lever 325 in a counter-clockwise direction (Fig. 19) until the bell crank lever 325, the rod 310 and the pin 315 have assumed the positions wherein they are shown in Figure 16, these positions being their neutral positions. When the bell crank lever 325 is displaced in a counter-clockwise direction by the pin 315, the bell crank lever 325 pulls the pin 331 to the left (Fig. 19) until it is restored to the position wherein it is shown in Figure 16, in which position the pin 331 is at the left hand end of the arcuate portion 343 of the slot 340. When the pin 331 is pulled to the left (Figure 19) it displaces the link 332 in the same direction so that the lever 55 is displaced angularly in a counter-clockwise direction and returned to its neutral or vertical position, whereupon the shaft 11 stops if it has not previously been stopped by the operation of the relief or pressure regulating valve 291. It will be noted that when the bell crank lever 325 is returned to the position wherein it is shown in Figure 16, its cam surface 350 abuts against the pin 174a.

Assuming now that a clean or fresh portion of the duplicating band 122 has been advanced over the duplicating portion of the duplicating cylinder 110 in the manner described above, and that the apparatus shown in Figure 16 has been restored to the condition in which it is illustrated in that figure, an impression may be formed on the duplicating band from a master sheet, of the hectograph type, by actuating the machine as follows: The operator presses downwardly on the toe end 306 of the foot treadle 300 so that the rod 310 is displaced downwardly. When the rod 310 is displaced downwardly from the position wherein it is shown in Figure 16 to the position wherein it is shown in Figure 20, the roller 312a co-operates with the inclined portion 361c of the stop 361 and displaces the plate 363 to the right (Figures 16 and 20) against the action of one of the springs 385. This displacement of the plate 363 causes the pawl 396 to rotate the ratchet 381 through a distance of one tooth and the arm 176 of the bell crank lever 175 rides up on one of the projections 378a of the cam 378 so that the bell crank lever 175 is displaced in a clockwise direction (Figures 16 and 20) the roller 173 being displaced from the position wherein it is shown in Figure 16 to the position wherein it is shown in Figure 20.

When the roller 173 is in the position wherein it is shown in Figure 20, rotation of the duplicating cylinder 110 in a counter-clockwise direction (Fig. 20) will cause the cam 135 to displace the roller 173 to the right (Fig. 20) and the bell crank lever 175 will be displaced angularly in a clockwise direction toward a position wherein its pin 174a will engage a notch 325a formed in the bell crank lever 325. The pin 174a will enter the notch 325a at the limit of downward movement of the rod 310.

During the downward movement of the rod 310 from its neutral position to the position wherein it is shown in Fig. 20, the pin 315 displaces the bell crank lever 325 in a counter-clockwise direction as described above and the pin 331 is displaced downwardly in the portion 345 of the slot 340 by the action of the slot 330. The pin 331 carries the free end of the lever 332 with it and that lever angularly displaces the lever 55 in a counter-clockwise direction. When the pin 331 is at the lower end of the portion 345 of the slot 340, the lever 55 has adjusted the valve member 50 so that the shaft 11 begins to rotate at its slowest speed in a counter-clockwise direction (Fig. 20). To increase the speed at which the shaft 11 is rotating when the lever 55 is in the position wherein it is shown in Figure 20, the operator depresses the toe portion 306 of the foot treadle 300 so much as desired so that the rod 310 is displaced downwardly. When the roller 312a has reached the bottom end of the slot 361, the pin 331 will have been displaced, by the slot 330 of the bell crank lever 325, to the left hand end (Figure 21) of the portion 344 of the slot 340. The lever 55 will then occupy the position wherein it is shown in Figure 21 and the valve 50 will be adjusted so that the shaft 11 will rotate at its maximum speed.

During the time the lever 332 is displaced from the position wherein it is shown in Figure 20 to the position wherein it is shown in Figure 21, the cam surface 318 on the lever 317 rides up to a position above the lug 335 as illustrated in Figure 21. After the mechanism has been adjusted for maximum speed as illustrated in Figure 21, the operator may manipulate the foot treadle 300 to bring the rod 310 into any position intermediate the position wherein it is shown in Figure 20 and the position wherein it is shown in Figure 21, and thereby vary the speed of the machine. In the intermediate positions, the shaft 11 rotates at intermediate speeds. In other words, the speed of the shaft 11 increases or decreases proportionately as the rod 310 is displaced downwardly or upwardly, respectively. This control of the speed is effected through the lever 317 and the lug 335, it being readily understood that when the rod 310 is displaced upwardly from the position wherein it is shown in Figure 21, the lever 317 is displaced angularly and its cam surface 318 engages the lug 335 and urges the levers 332 and 55 to the right (Figure 21) to lower the speed of the shaft 11. When the lever 332 is displaced in this manner, the pin 331 is displaced to the right (Figure 21) and it displaces the bell crank lever 325 angularly in a clockwise direction so that the pin 315 remains at the lower end of the slot 322. Then, if the operator wishes to increase the speed of the shaft 11, it is only necessary to displace the rod 310 downwardly, whereupon the pin 315 will displace the bell crank lever 325 angularly in a counter-clockwise direction and restore the pin 331 to the position wherein it is shown in Figure 21. Obviously, the operator may vary the speed, as desired, throughout the operation of the machine. Thus, it may be increased or decreased repeatedly.

Now, it will be readily understood that if, when the operator first depressed the toe portion 306 of the foot treadle 300, a master sheet were placed in the feeding tray 180 with its lower end resting against the stop member 242, the subsequent rotation of the shaft 11 at its lowest speed, when the rod 310 reached the position wherein it is shown in Figure 20, would cause the rotation of the duplicating cylinder 110 at its lowest speed and the feeding tray 180 would be angularly displaced in the manner described above to release the master sheet so that it would gravitate to the feed rolls 245 and 248. The feed rolls 245 and 248 would then, at the proper time, advance the master sheet to the platen roller 267 and the duplicating band 122 in such manner that its forward end would project beyond the forward portion of the duplicating band. The master sheet would be drawn around with the duplicating band and would form the desired impression thereon. When the forward end of the master sheet approached the rolls 270 and 271 it would be guided between them and the rolls would strip it from the duplicating band and deliver it to the table 280. It is readily understood that the duplicating cylinder is preferably rotated at its lowest speed while the impression is being made thereon from the master sheet. While the master sheet is being stripped from the duplicating band, the operator places the first sheet 260 to be duplicated in the feeding tray 180. Then, when the master sheet has been stripped completely from the duplicating band, the operator depresses the toe end 306 of the foot treadle 300 to its maximum speed or any intermediate speed and each time a sheet 260 gravitates from the feed table 180, he replaces it with another. This cycle of operation is continued until the required number of copies have been made. Each of the copies is stripped from the duplicating band in the manner described above and delivered to the table 280.

A feature of the invention is the provision of the variable speed transmission between the electric motor 186 and the shaft 11. This permits the operator to control the speed of the machine at all times. While the impression upon the duplicating band is fresh and clear, the machine can be operated at a greater speed than it can when the impression becomes blurred and indistinct, it being understood that after a number of copies have been made from the impression, the remaining copies must be held in contact therewith for a longer time if they are to be clear and distinct. The variable speed transmission also permits the operator to operate the machine at the highest speed at which his skill will permit him to feed it.

When the operator wishes to stop the machine after the printing operation, he depresses the heel portion thereof so that the rod 310 is displaced upwardly until it enters the inclined portion 361c of the slot 361 (Fig. 10). One of the springs 385 then displaces the plate 363 to the left (Fig. 21) and the inclined portion 361c and the roller 312a cooperate to urge the rod 310 upwardly. The displacement of the plate 363 to the left (Fig. 21) causes the pawl 397 to displace the ratchet 381 angularly in a counter-clockwise direction (Fig. 10) a distance of one tooth so that the space between two of the projections 378a on the cam 378 is presented to the arm 176 of the bell crank lever 175. The spring 177 then displaces the lever 175 in a counter-clockwise direction (Fig. 21) until the roller 173 engages the outer cylindrical surface of the cam 135. During the initial upward movement of the rod 310, the pin 315 rides upwardly in the slot 322 of the lever 325 and displaces the lever 325 in a clockwise direction (Figs. 21 and 22) until the lever 325 assumes the position wherein it is shown in Figure 22. This displacement of the lever 325 causes the pin 331 to be displaced to the right hand end (Fig. 22) of the arcuate portion 344 of the slot 340 in the plate 341. As stated above, when the pin 331 is at the right hand end of the arcuate portion 344 of the slot 340, the valve member 50 is adjusted so that the duplicating cylinder 110 rotates at its minimum speed in a counter-clockwise direction. When the cam surface 172 is presented to the roller 173 during this slow rotation of the duplicating cylinder 110, the roller 173 rolls down on the cam surface and snaps into the slot 180 of the cam 135. This movement of the roller 173 and its lever 175 is caused by the spring 177. When the roller 173 engages the slot 180, it locks the duplicating cylinder against rotation and simultaneously the shaft 11 ceases to drive the cylinder. Thus, when the lever 175 is displaced in a counter-clockwise direction by the spring 177 to bring the roller 173 into the slot 180, the pin 174a rides along the cam surface 350 of the lever 325 and angularly displaces the lever 325 in a clockwise direction (Fig. 21) so that the pin 331 is displaced to the upper end of the intermediate portion 345 of the slot 340. When the pin reaches this position, the apparatus is in the condition in which it is illustrated in Figures 16 and the operator may again advance the duplicating band 122. It is readily understood that during the upward travel of the pin 331 in the intermediate portion 345 of the slot 340, the lever 332 is being displaced to the right to bring the valve 50 into its neutral position. In other words, the shaft 11 ceases to drive the duplicating cylinder at the same time the roller 173 engages the slot 180.

In the preferred operation of the improved machine, the operator keeps his foot upon the foot treadle 300 and assists the springs 385 to displace the rod 310 upwardly and downwardly as the case may be.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. In a machine of the character described, a rotatable platen cylinder, a duplicating band carried by said cylinder, power driven means for rotating said cylinder, means operated by said power driven means for advancing said band on said cylinder, and means holding said cylinder against rotation while said band is being advanced.

2. In a machine of the character described, platen means, a duplicating band for said platen means, means for pressing a sheet of paper into contact with said band, power driven means for causing movement of at least one of said means, and means operated by said power driven means for advancing said band on said platen means while said platen means and said pressing means are stationary.

3. In a machine of the character described, a platen, a duplicating band for said platen, means for pressing a sheet of paper into contact with said band, power driven means for causing a printing movement between said platen and said pressing means, and means operated by said power driven means for advancing said band on said platen and stretching it while one end of the band is held against movement.

4. In a machine of the character described, a rotatable platen cylinder, a duplicating band carried by said cylinder, power driven means for rotating said cylinder, manually operated means for locking said cylinder against rotation, and means operated by said power driven means for advancing said duplicating band while said cylinder is stationary.

5. In a machine of the character described, a rotatable platen cylinder, a duplicating band carried by said cylinder, means for feeding sheets to be duplicated to said duplicating band, means for stripping the duplicated sheets from said band, power driven means for rotating said cylinder and for actuating said feeding means and said stripping means, and means operated by said power driven means for advancing said band on said cylinder.

6. In a machine of the character described, a platen, a duplicating band for said platen, means for pressing a sheet of paper into contact with said duplicating band, means including hydraulic power transmission means for causing a printing movement between said platen and said pressing means, means operated by said hydraulic power transmission means for advancing said band on said platen and for drawing said band taut on said platen, and means controlling said power transmission means to limit the pull on said band when it is being drawn taut on said platen.

7. In a machine of the character described, a platen, a duplicating band for said platen, means for pressing a sheet of paper into contact with said duplicating band, power driven means for causing a printing movement between said platen and said pressing means, means operated by said power driven means for drawing said band taut on said platen, and means causing said power driven means to become functionally inoperative if it exerts a predetermined maximum pull on said band while said band is being drawn taut on said platen.

8. In a machine of the character described, a platen, a duplicating band for said platen, means for pressing a sheet of paper into contact with said band, an electric motor, and variable speed transmission means operated by said motor for causing a printing displacement between said platen and said pressing means.

9. In a machine of the character described, a platen, a duplicating band for said platen, means for pressing a sheet of paper into contact with said band, an electric motor, variable speed transmission means operated by said motor for causing a printing displacement between said platen and said pressing means, and means operated by said variable speed transmission means for advancing said band on said platen.

10. In a machine of the character described, a platen, a duplicating band for said platen, means for pressing a sheet of paper into contact with said band, an electric motor, variable speed transmission means driven by said motor for causing a printing movement between said platen and said pressing means, a foot treadle, and means controlled by said foot treadle for controlling said variable speed transmission means to vary the speed of the relative movement between said platen and said pressing means.

11. In a machine of the character described, a platen, a duplicating band for said platen, means for pressing a sheet of paper into contact with said band, an electric motor, variable speed transmission means actuated by said motor to cause a printing displacement between said platen and said pressing means, a foot treadle, means controlled by said foot treadle for controlling said variable speed transmission means to vary the speed thereof and to change its direction of rotation, and means actuated by said variable speed transmission means for advancing said band on said platen.

12. In a machine of the character described, a platen, a pressure member co-operating with said platen, an electric motor, variable speed transmission means operated by said motor for causing a printing displacement between said platen and said pressure means, and means actuated by the feet of the operator for adjusting said variable speed transmission means.

13. In a machine of the character described, a platen, a duplicating band for said platen, means for pressing a sheet of paper into contact with said band, an electric motor, variable speed transmission means operated by said motor for causing a printing displacement between said platen and said pressing means, and means controlled by the feet of the operator for adjusting said variable speed transmission means.

14. In a machine of the character described, a platen cylinder, a duplicating band for said cylinder, means for pressing a sheet of paper into contact with said band, an electric motor, variable speed transmission means operated by said motor for rotating said cylinder, means actuated by said variable speed transmission means to advance said band on said cylinder, and means controlled by the feet of the operator for adjusting said variable speed transmission means.

15. In a machine of the character described, a platen, pressure means co-operating with said platen, means including hydraulic power transmission means for causing a printing movement between said platen and said pressure means, and means controlled by the operator for adjusting said hydraulic means for varying the speed of relative movement between said platen and said pressure means.

16. In a machine of the character described, a platen, a duplicating band for said platen, means for pressing a sheet of paper into contact with said duplicating band, means including hydraulic power transmission means for causing a printing movement between said platen and said pressing means, and means controlled by the operator for adjusting said hydraulic means to vary the speed of relative movement between said platen and said pressing means.

17. In a machine of the character described, a platen cylinder, a duplicating band for said cylinder, means for pressing a sheet of paper into contact with said duplicating band when said cylinder is rotated, means including hydraulic power transmission means for rotating said cylinder, and means controlled by the operator for adjusting said hydraulic transmission means to vary the speed at which the cylinder rotates.

18. In a machine of the character described, a platen cylinder, a duplicating band for said cylinder, means for pressing a sheet of paper into contact with said duplicating band when the cylinder is rotated, means including hydraulic power transmission means for rotating said cylinder, and means controlled by the feet of the operator for adjusting said hydraulic means to vary the speed at which the cylinder rotates.

19. In a machine of the character described, a platen cylinder, a duplicating band for said cylinder, means for pressing a sheet of paper into contact with said duplicating band when said cylinder is rotated, means including hydraulic power transmission means for rotating said cylinder and advancing said band thereon, and means controlled by the operator for adjusting said hydraulic means to vary the speed at which the cylinder is rotated.

20. In a machine of the character described, a platen, pressure means co-operating with said platen during duplicating operations thereof, an electric motor, means including variable speed transmission means driven by said motor for causing a printing movement between said platen and said pressure means, and means actuated by the operator independently of his hands for adjusting said variable speed transmission means to vary the speed of relative movement between the platen and said pressure means.

21. In a machine of the character described, a duplicating cylinder, a duplicating band for said cylinder, power driven means for rotating said cylinder and for advancing said band on said cylinder, and automatic means for locking said cylinder in a predetermined position while said band is being advanced.

22. In a machine of the character described, a duplicating cylinder, spindles carried by said cylinder, a duplicating band carried by said spindles, means for rotating one of said spindles to advance said band on said cylinder while said cylinder is stationary, and power driven means for driving said advancing means and for rotating said cylinder.

23. In a machine of the character described, a duplicating cylinder, a duplicating band for said cylinder, means including power transmission means having a shaft for rotating said cylinder when said shaft is driven in a predetermined direction, means for adjusting said power transmission means to reverse the direction of rotation of said shaft, and means for advancing said band on said cylinder, said advancing means being actuated by said shaft when said shaft is rotated in said reverse direction.

24. In a machine of the character described, a platen, a duplicating band for said platen, means for pressing a sheet of paper against said duplicating band, an electric motor, means including a shaft operatively connecting said motor to said platen to effect a printing movement between said platen and said pressing means, means for adjusting said connecting means to reverse the direction of rotation of said shaft, and means actuated by said shaft for advancing said band on said platen.

25. In a machine of the character described, a platen, a duplicating band carried by said platen, means for pressing a sheet of paper into contact with said band, means including reversible power transmission means for causing a printing movement between said platen and said pressing means and for advancing said band on said platen, a foot treadle, and means actuated by said foot treadle for starting and stopping said power transmission means and reversing the same.

26. In a machine of the character described, a duplicating cylinder, a spindle rotatably mounted in said cylinder, a second spindle rotatably mounted in said cylinder, a duplicating band carried by said spindles and extending across the duplicating surface of said cylinder, means for locking the first mentioned spindle against rotation around its longitudinal axis, means for locking said second spindle against rotation around its longitudinal axis, means for rendering both of said locking means functionally inoperative, power driven means for rotating the first mentioned spindle around its longitudinal axis, and means actuated by said power driven means for rotating said cylinder.

27. In a machine of the character described, duplicating apparatus, power driven means for driving said duplicating apparatus, means controlled by the operator independently of his hands for adjusting said power driven means to vary the speed of said duplicating apparatus, and automatic means for locking said duplicating apparatus against operation when said power driven means is rendered functionally inoperative to drive said duplicating apparatus.

28. In a machine of the character described, a platen, a duplicating band for said platen, means for pressing a sheet of paper into contact with said band, power driven means for causing a printing movement between said platen and said pressing means, and a single control member operable by the operator and movable into a plurality of positions to adjust the power driven means to cause said relative movement and to advance said band.

29. Apparatus for feeding sheets of paper to a platen comprising a table adapted to hold a sheet of paper and disposed at a large angle to the horizontal, a stop member for preventing said sheet of paper from gravitating downwardly from said table, means for causing relative movement between said table and said stop member to permit said sheet of paper to gravitate downwardly from said table, a margin member engageable by said paper when it gravitates from said table and adapted to stop it in a predetermined position, a driven roller engageable with said paper when it is resting against said margin member, means pivoting said driven roller on an axis spaced from the longitudinal axis of the roller, and means for angularly displacing the last mentioned means around said spaced axis whereby the driven roller will disengage said paper from said margin member and advance it to said platen.

30. Apparatus for feeding sheets of paper to a platen comprising a pivoted table disposed at a large angle to the horizontal and adapted to hold a sheet of paper, a stop member for preventing said sheet of paper from gravitating downwardly from said table, means for tilting said table to disengage said sheet of paper from said stop member, a margin member engageable by said paper when it gravitates from said table, a driven roller engageable with said paper when it is resting against said margin member, means pivoting said driven roller on an axis spaced from the longitudinal axis of the roller, and means for angularly displacing the last mentioned means around said spaced axis whereby the driven roller will disengage said paper from said margin member and advance it to said platen.

31. Apparatus for feeding sheets of paper to a platen comprising a frame in which the platen is mounted, a table disposed at a large angle to the horizontal and adapted to hold a sheet of paper, a stop member for preventing said sheet of paper from gravitating downwardly from said table, means for causing relative movement between said table and said stop member to permit said sheet of paper to gravitate downwardly from said table, a margin member rigidly secured to said frame and engageable by said paper when it gravitates from said table, a driven roller engageable with said paper when it is resting against said margin member, means pivoting said driven roller on an axis spaced from the longitudinal axis of the roller, and means for angularly displacing the last mentioned means around said spaced axis whereby the driven roller will disengage said paper from said margin member and advance it to said platen.

32. Apparatus for stripping sheets of paper from a duplicating cylinder, said apparatus comprising a driven roller, a pivotally mounted bracket member, the pivotal axis of said bracket member being coincident with the longitudinal axis of said driven roller, a second roller rotatably journaled in said bracket member, means for angularly displacing said bracket member in one direction around the longitudinal axis of said driven roller, and means for angularly displacing said bracket member in the other direction around said longitudinal axis.

33. Apparatus for stripping sheets of paper from a duplicating cylinder having an opening in its duplicating surface, said apparatus comprising a driven roller, a pivotally mounted bracket member, the pivotal axis of said bracket member being coincident with the longitudinal axis of said driven roller, a second roller contacting said driven roller and rotatably journaled in said bracket member, means for angularly displacing said bracket member in one direction around the longitudinal axis of said driven roller to bring said second roller into the opening in said cylinder, and means for angularly displacing said bracket member in the other direction around said longitudinal axis whereby said rollers grip the sheet of paper and strip it from said duplicating cylinder.

34. In a machine of the character described, a platen, a plurality of spindles operatively disposed with respect to said platen, a duplicating band having its ends attached to said spindles and having an intermediate portion thereof disposed across the platen, ratchets for preventing rotation of said spindles, means for pressing a sheet of paper into contact with said duplicating band, means for causing a printing movement by said platen and said pressing means, means for actuating said means for causing a printing movement, and means operated by said actuating means for controlling said ratchets.

35. In apparatus of the character described, a platen, a plurality of spindles associated with said platen, a duplicating band having its ends attached to said spindles and having an intermediate portion thereof disposed across said platen, means for holding said spindles against rotation, means for pressing a sheet of paper into contact with said duplicating band, means for causing a printing movement between platen and said pressing means, means for actuating said means for causing a printing movement, and means operated by said actuating means for controlling said holding means.

36. In apparatus of the character described, a platen, a pair of spindles associated with said platen, a duplicating band having its ends attached to said spindles and having an intermediate portion thereof disposed across said platen, means for pressing a sheet of paper into contact with said duplicating band, means for holding said spindles against rotation, power driven means, means driven by said power driven means for causing a printing movement between said platen and said pressing means, means driven by said power driven means for rotating one of said spindles, and means for controlling said holding means.

37. In apparatus of the character described, a platen, a pair of spindles associated with said platen, a duplicating band having its ends attached to said spindles and having an intermediate portion thereof disposed across said platen, means for pressing a sheet of paper into contact with said duplicating band, means for holding said spindles against rotation, power driven means, means driven by said power driven means for causing a printing movement between said platen and said pressing means, means driven by said power driven means for rotating one of said spindles, and means actuated by said driven means for controlling said holding means.

38. In a machine of the character described, a platen, a plurality of spindles operatively disposed with respect to said platen, a duplicating band having its ends attached to said spindles and having an intermediate portion thereof disposed across the platen, means for holding said spindles against rotation, means for pressing a sheet of paper into contact with said duplicating band, means for causing a printing movement between said platen and said pressing means, means for actuating said means for causing a printing movement, means operated by said actuating movement for controlling said holding means, a manually controlled member, and means operatively connecting said member to said means for causing a printing movement and said actuating means to control the operation thereof.

39. In a machine of the character described, a platen, a plurality of spindles operatively disposed with respect to said platen, a duplicating band having its ends attached to said spindles and having an intermediate portion thereof disposed across the platen, ratchets for preventing rotation of said spindles, pawls engageable with said ratchets, means for pressing a sheet of paper into contact with said duplicating band, means for causing a printing movement between said platen and said pressing means, means for actuating said means for causing a printing movement, means operated by said actuating means for controlling said pawls, a manually controlled member, and means operatively connecting said manually controlled member with said means for causing a printing movement, said actuating means and said pawl controlling means whereby said member selectively controls the operation thereof.

40. In apparatus of the character described, a platen, a pair of spindles associated with said platen, a duplicating band having its ends attached to said spindles and having an intermediate portion thereof disposed across said platen, means for pressing a sheet of paper into contact with said duplicating band, means for holding said spindles against rotation, power driven means, means driven by said power driven means for causing a printing movement between said platen and said pressing means, means driven by said power driven means for rotating one of said spindles, means actuated by said power driven means for controlling said holding means, a manually controlled member, and means operatively connecting said member to said displacing means, said rotating means and said means for controlling said holding means, whereby said member selectively controls the same.

41. In apparatus of the character described, a platen, a plurality of spindles associated with said platen, a duplicating band having its ends attached to said spindles and having an intermediate portion thereof disposed across said platen, a ratchet associated with each of said spindles, a pawl engageable with each of said ratchets, a plurality of cam members controlling said pawls, and means for actuating said cam members to bring said pawls into and out of engagement with said ratchets.

42. In duplicating apparatus of the kind described, a platen, a plurality of spindles associated with said platen, a duplicating band having its ends attached to said spindles and having an intermediate portion thereof disposed across said platen, means for rotating one of said spindles, a ratchet for each of said spindles, a pawl for each of said ratchets, cam members for controlling said pawls, and common means for actuating said cam members and for controlling said rotating means.

43. In apparatus of the kind described, a platen cylinder, a plurality of spindles mounted in said cylinder, a duplicating band having its ends attached to said spindles and having an intermediate portion thereof disposed on said cylinder to provide a duplicating surface, power driven means for rotating said cylinder and for advancing said duplicating band on said cylinder, a ratchet for each of said spindles, a pawl for each of said ratchets, cam means for controlling said pawls, and common means for actuating said cam means and for controlling said pawl driven means.

44. In apparatus of the kind described, a frame, a duplicating cylinder journaled in said frame, an electric motor mounted in said frame, a hydraulic transmission device positioned in said frame and driven by said motor, means for feeding sheets of paper to said cylinder, a foot treadle, and means operatively connecting said foot treadle to said transmission device and said feeding means to control them selectively.

45. In apparatus of the kind described, a platen cylinder, a duplicating band for said cylinder, variable speed transmission means including a shaft driven thereby, means for controlling said speed transmission means to drive said shaft in either direction, means driven by said shaft when it rotates in one direction for rotating said cylinder and means driven by said shaft when it rotates in the other direction for advancing said duplicating band on said cylinder.

46. In a machine of the character described, a platen, a duplicating band on said platen, means for pressing a sheet of paper into contact with said band, an electric motor, variable speed transmission means operated by said motor for causing a printing movement between said platen and said pressing means, and means actuated by said variable speed transmission means to advance said band on said platen.

47. In a duplicating machine, a duplicating drum, power driven means for rotating said drum, a duplicating band carried by said drum, means actuated by said power driven means for advancing said band on said drum, and means automatically locking said drum in a predetermined position each time it is disconnected from said power driven means.

48. In a duplicating machine, a duplicating drum, power driven means for rotating said drum, manually actuated means for disconnecting said drum from said power driven means to stop said drum, a duplicating band mounted on said drum, means actuated by said power driven means for advancing said band on said drum, and means controlled by said manually operated means to lock said drum automatically in a predetermined position each time said drum is disconnected from said power driven means.

49. In a machine of the character described, a rotatable platen cylinder, a duplicating band carried by said cylinder, means for feeding sheets to be duplicated to said duplicating band, means for stripping the duplicated sheets from said band, power driven means for rotating said cylinder and for actuating said feeding means and said stripping means, means operated by said power driven means for advancing said band on said cylinder, and means automatically locking said cylinder in a predetermined position each time it is disconnected from said power driven means.

50. In a machine of the character described, a platen, a duplicating band for said platen, means for pressing a sheet of paper into contact with said duplicating band, power driven means for causing a printing movement between said platen and said pressure means, means operated by said power driven means for drawing said band taut on said platen, means causing said power driven means to become functionally inoperative if it exerts a predetermined maximum pull on said band while said band is being drawn taut on said platen, and means automatically locking said platen in a predetermined position with respect to said pressing means each time said platen is disconnected from said power driven means.

51. In a machine of the character described, a platen, a duplicating band for said platen, means for pressing a sheet of paper into contact with said duplicating band, power driven means, means for connecting said power driven means to said platen to cause a printing movement between said platen, means operated by said power driven means for advancing said band and drawing it taut thereon, means causing said power driven means to become functionally inoperative if it exerts a predetermined maximum pull on said band while said band is being drawn taut on said platen, and means automatically locking said platen in a predetermined position with respect to said pressing means each time said platen is disconnected from said power driven means.

ALFRED MARCHEV.